(12) United States Patent
Barroux et al.

(10) Patent No.: US 12,527,343 B2
(45) Date of Patent: Jan. 20, 2026

(54) PLANT PROTEIN-POLYSACCHARIDE FILMS

(71) Applicant: XAMPLA LIMITED, Cambridge (GB)

(72) Inventors: Hugo Thomas Barroux, Cambridge (GB); Georgios Gkotsis, Cambridge (GB); Marc Rodriguez Garcia, Cambridge (GB); Nigel Patrick Sommerville-Roberts, Cambridge (GB); Polly Helena Ruth Keen, Cambridge (GB); James Alexander Aiken, Cambridge (GB)

(73) Assignee: XAMPLA LIMITED, Cambridge (GB)

( * ) Notice: Subject to any disclaimer, the term of this patent is extended or adjusted under 35 U.S.C. 154(b) by 0 days.

(21) Appl. No.: 18/704,509

(22) PCT Filed: Nov. 4, 2022

(86) PCT No.: PCT/EP2022/080878
§ 371 (c)(1),
(2) Date: Apr. 25, 2024

(87) PCT Pub. No.: WO2023/079115
PCT Pub. Date: May 11, 2023

(65) Prior Publication Data
US 2025/0214729 A1    Jul. 3, 2025

(30) Foreign Application Priority Data
Nov. 5, 2021  (EP) ...................................... 21386068

(51) Int. Cl.
*B65D 65/42*      (2006.01)
*B65B 11/00*      (2006.01)
(Continued)

(52) U.S. Cl.
CPC .......... *B65B 25/001* (2013.01); *B65B 11/004* (2013.01); *B65D 65/42* (2013.01); *C11D 17/044* (2013.01)

(58) Field of Classification Search
CPC ..... B65D 65/42; B65B 25/001; B65B 11/004; C11D 17/044
(Continued)

(56) References Cited

U.S. PATENT DOCUMENTS 5,089,307 A    2/1992   Ninomiya et al.
6,180,150 B1 *  1/2001  Schafer .................. B65D 29/04
                                                    426/135
(Continued)

FOREIGN PATENT DOCUMENTS

CN    107474554 A    12/2017
CN    108250493 A    7/2018
CN    108976735 A    12/2018

OTHER PUBLICATIONS

Chen et al., Development and characterization of a hydroxypropyl starch/zein bilayer edible film. Int J Biol Macromol. Dec. 1, 2019;141:1175-1182.

(Continued)

*Primary Examiner* — Jacob K Ackun
(74) *Attorney, Agent, or Firm* — Merchant & Gould P.C.

(57) ABSTRACT

The present invention relates to a film comprising greater than or equal to 50 wt % of a combination of a plant protein and polysaccharide based upon the total weight of the film at 55% relative humidity and 22° C.C, wherein the weight ratio of polysaccharide to plant protein is in the range 0.1:1 to 2:1, and wherein the plant protein has been pre-treated with an organic acid.

20 Claims, 5 Drawing Sheets

(51) Int. Cl.
*B65B 25/00* (2006.01)
*C11D 17/04* (2006.01)

(58) Field of Classification Search
USPC ......... 206/524.1, 524.6, 524.7, 524.2, 524.3, 206/524.9
See application file for complete search history.

(56) References Cited

U.S. PATENT DOCUMENTS

| | | | | |
|---|---|---|---|---|
| 2022/0144517 | A1* | 5/2022 | Salumäe | A23L 29/231 |
| 2024/0016147 | A1* | 1/2024 | Frank | B01J 13/22 |
| 2025/0059475 | A1* | 2/2025 | Espeit | C11D 17/0091 |

OTHER PUBLICATIONS

How et al., Removal of Phenolic Compounds from Soy Protein Extracts Using Activated Carbon. Journal of Food Science. May 1982;47(3):933-940.

Liu et al., Starch and mineral element accumulation during root tuber expansion period of Pueraria thomsonii Benth. Food Chem. May 1, 2021;343:128445, 7 pages.

Materialstoday, Polymer film spun out from plant proteins. Retrieved online at: https://www.materialstoday.com/biomaterials/news/polymer-film-from-plant-proteins/. 3 pages, Jun. 18, 2021.

Misra et al., Effect of storage on nutritional value of potato flour made from three potato varieties. Plant Foods for Human Nutrition. 2003;58:1-10.

Reynolds, Viable Edible Packaging Applications: Rare but Real (and Thought-Provoking). Retrieved online at: https://www.packworld.com/TakeFive/video/21903483/meal-kit-brands-edible-packaging-lets-the-body-do-the-composting-take-five-video. Packaging World. 15 pages, Nov. 19, 2021.

International Search Report and Written Opinion for Application No. PCT/EP2022/080878, dated Feb. 7, 2023, 27 pages.

International Search Report and Written Opinion for Application No. PCT/EP2022/080873, dated Jan. 5, 2023, 25 pages.

* cited by examiner

PLANT PROTEIN-POLYSACCHARIDE FILMS

CROSS REFERENCE TO RELATED APPLICATIONS

This application is a U.S. National Stage Application filed under 35 U.S.C. § 371, based on International Patent Application No. PCT/EP2022/080878, filed on Nov. 4, 2022, which claims priority to EP patent application Ser. No. 21/386,068.7, filed on Nov. 5, 2021. The entire contents of each of the above applications are incorporated herein by reference.

FIELD OF THE INVENTION

The present invention relates to films comprising a plant protein and polysaccharide, and to methods for preparing the films. The present invention also relates to uses of the films and to methods involving the film, including to coat or enclose a product. The present invention also relates to a film-forming composition and to films obtained therefrom.

BACKGROUND

There is an increasingly urgent need to reduce the environmental impact of many day-to-day activities and to reduce the amounts of non-renewable resources involved in these activities. An example of this is the increasing use of biodegradable packaging to replace conventional plastics such as polyethylene and polypropylene (e.g. edible films for use in packaging of foodstuffs). Biopolymers, including polysaccharides and proteins are especially useful materials due to their renewable source and often very good biodegradability characteristics. An increasing trend is for the use of plant-derived biopolymers, rather than animal-derived biopolymers. Plant-derived biopolymers typically require fewer resources overall to produce than animal-derived biopolymers and do not have the same ethical issues as animal-derived materials. However, plant-based biopolymers often have more significant, and significantly different, processing challenges compared to many animal-derived biopolymers and require unique solutions. In addition, certain plant materials, such as gluten, can cause health issues and allergic reactions in people.

In this regard, particular focus has been put on the development of packaging materials made from plant-derived bio-polymers including water soluble and water dispersible films. Traditionally, polysaccharides such as starches have been used for this purpose due to their often low cost and ready availability. However, the mechanical properties of polysaccharide films, and especially starch films, are typically highly dependent on the surrounding humidity and temperature conditions. This makes production scale-up more complex and leads to a narrow window of use when used to package a consumer product. Furthermore, starch films typically tend to have low tensile strength and/or poor elongation, meaning that they can be brittle or easily broken or torn, thereby limiting their usefulness as a packaging film. Films used in typical packaging machinery, such as Vertical-Form-Fill-Seal sachet makers, need to be robust enough to survive being pulled through the equipment. Films that have excessive elongation when being pulled are hard to handle in typical packaging equipment as the elongation makes alignment and indexing very difficult. Typically, starches can be chemically modified, such as by cross-linking, to improve mechanical properties, such as tensile strength, but this often has undesirable consequences such as reduced solubility and/or dispersibility in water, reduced biodegradability, use of non-renewable synthetic chemicals and increased complexity and cost.

A particular problem for starch-based films is that starch is sensitive to low temperatures due to retrogradation. Packaging of foodstuffs can often be subjected to low temperatures as well as high humidity when the packaged foodstuff is stored in a fridge. This has meant that it has not been possible to develop commercial films containing significant amounts of starch that are robust enough to withstand all of the conditions that may be required for foodstuff packaging. However, the low cost and ready availability of starch means that it is still a desirable material to incorporate into such films. The term "starch-based" or "polysaccharide-based" refers to materials that contain a significant level of starch or polysaccharide, such as >5 wt %.

Accordingly, there exists a need to develop polysaccharide-based and especially starch-based water-soluble/water dispersible films that have sufficiently robust and appropriate mechanical properties for them to be used as packaging films. They need to be capable of being handled in a manufacturing process and formed into packages, eg by heat-sealing, as well as being able to survive transportation and storage over a range of temperatures, including low temperatures. Such films should not require materials having synthetic chemical modification, be mostly or wholly based on plant-derived biopolymers, have high biodegradability as well as being safe and economic to produce. A preferred feature is for foodstuff packaging to be edible, so as to further minimise waste and increase consumer convenience.

There is also a need for such films to be suitable for storage in humid environments, in particular for use in wrapping homecare and personal care products, where this is likely to be stored in bathrooms and kitchens. Current synthetic polymers such as PVOH can become sticky in humid conditions which leads to individually wrapped tablets or sachets sticking to each other rendering them unusable. Polysaccharide-based, and especially starch-based, films are also highly sensitive to environmental moisture and also become sticky and can eventually disintegrate rendering them unusable for such product applications.

SUMMARY OF THE INVENTION

Viewed from a first aspect, the present invention provides a film comprising greater than or equal to 50 wt % of a combination of a polysaccharide and a plant protein based upon the total weight of the film at 55% relative humidity and 22° C., wherein the weight ratio of polysaccharide to plant protein is in the range 0.1:1 to 2:1, and wherein the plant protein has been pre-treated with an organic acid. The incorporation of plant protein in the film can mitigate the negatives of the polysaccharide material, such as limited tensile strength, whilst maintaining the advantages such high biodegradability, more efficient use of renewable raw materials and avoidance of ethical concerns. Plant proteins are typically more difficult to process than animal proteins due to their higher level of non-polar amino acids and consequent lower solubility. Simply trying to form a film from a plant protein "as is" will not be successful. Appropriate pre-treatment of the plant protein to unfold the proteins is required to enable the protein to be successfully incorporated with the polysaccharide. Treatments of animal-derived proteins are typically not relevant or applicable to the treatment of plant proteins and different plant proteins can have different physical or chemical properties. Corn zein, for example, is known for making brittle films.

Films incorporating alkali-treated plant proteins are known in the art. Typically, plant proteins slurries are treated at high pHs and temperatures to solubilise the plant proteins. The solubilised protein solution is then typically blended with other materials, such as plasticisers, cast on a flat surface and dried to form a film. However, due to the nature of the alkaline-induced changes to the protein, the treated proteins are more susceptible to moisture and less robust. Plant protein films made by this approach typically have lower tensile strengths and higher elongation, especially at higher humidity. This makes them less suitable for use in packaging equipment. In addition, the alkaline treatment typically results in plant protein films that have poorer storage stability at higher humidity. This makes alkali-treated proteins not suitable as materials to mitigate the negatives associated with polysaccharide-based films.

Plant proteins can also be solubilised by salt solutions at low protein concentrations. However, forming films incorporating plant protein by use of low protein content solutions is just not economically viable due to the high amount of water needing to be evaporated to form such films.

Treatment of plant proteins with organic acids, in combination with heat and shear, can result in treated plant proteins that are suitable for incorporation in polysaccharide-based films so as to mitigate the negatives associated with the polysaccharide. Without wishing to be bound by theory, it is believed that when the plant protein is added to the organic-acid based solvent system and subjected to a physical stimulus such as heating and/or sonication, the plant proteins partially unfold, resulting in the exposure of hydrophobic amino acids initially buried within the protein native structure. Once partially unfolded, the co-solvents are able to interact with the unfolded protein molecules. For example, an organic acid has greater access to protonate amino acid residues, as well as enabling the formation of anion salt bridges that stabilise hydrophobic interactions. Also, upon heating at elevated temperatures, protein-protein non-covalent intermolecular contacts are disrupted.

Further, it is believed that upon cooling the protein solution to below the sol-gel temperature, protein-protein non-covalent intermolecular contacts are enabled, thus promoting the self-assembly of plant protein molecules into a network of inter-connected protein aggregates. This means that organic-acid treated plant proteins are typically less susceptible to moisture than alkali-treated plant proteins but still able to form films. A further benefit of organic acid treatment is that higher protein concentrations can typically be used, for example as compared to the use of salt solutions. This simplifies production and lowers production costs by reducing the amounts of solvent needing to be evaporated off when plant protein is incorporated in polysaccharide-based films.

Hence the negatives associated with polysaccharide films can be better mitigated by the incorporation of organic-acid treated plant proteins.

It is highly preferred if the solvent system comprising organic acid does not comprise highly concentrated organic acids, such as glacial acetic acid, due to the safety issues associated with handling of such materials. Lower concentrations are suitable.

Preferably, the film of the first aspect of the present invention comprises:
 a first layer comprising polysaccharide; and
 a second layer comprising a plant protein, wherein the plant protein has been pre-treated with an organic acid;
 wherein the second layer is in contact with a first surface of the first layer.

Viewed from a further aspect, the present invention provides a process for preparing a film as hereinbefore described, comprising the steps of:
 (i) mixing the polysaccharide in water, optionally with sonication, to form a polysaccharide mixture;
 (ii) dissolving the plant protein in water and an organic acid, optionally with sonication, to form a protein solution;
 (iii) mixing the polysaccharide mixture and the protein solution to form a film-forming composition; and
 (iv) forming the film-forming composition into a film comprising greater than or equal to 50 wt % of a combination of a plant protein and polysaccharide based upon the total weight of the film at 55% relative humidity and 22° C., wherein the weight ratio of polysaccharide to plant protein is in the range 0.1:1 to 2:1.

Viewed from a further aspect, the present invention provides a process for preparing a film as hereinbefore described, comprising the steps of:
 (i) mixing the polysaccharide in water, optionally with sonication, to form a polysaccharide mixture;
 (ii) forming the polysaccharide mixture into a first layer on a surface;
 (iii) dissolving the plant protein in water and an organic acid, optionally with sonication, to form a protein solution; and
 (iv) forming the protein solution into a second layer on a first surface of the first layer, so that the film comprises greater than or equal to 50 wt % of a combination of a plant protein and polysaccharide based upon the total weight of the film at 55% relative humidity and 22° C., and the weight ratio of polysaccharide to plant protein being in the range 0.1:1 to 2:1.

Viewed from a further aspect, the present invention provides a product, preferably a homecare or a personal care product, most preferred a dishwasher tablet, coated with or enclosed by a film as hereinbefore described.

Viewed from a further aspect, the present invention provides a method of coating or enclosing a product, preferably a foodstuff, comprising the steps of:
 (i) wrapping the product in a film as hereinbefore described; and
 (ii) sealing the film around the product.

Viewed from a further aspect, the present invention provides the use of a film as hereinbefore described to coat or enclose a product, preferably a foodstuff.

A method of releasing a product coated or enclosed with a film as hereinbefore described, comprising the steps of:
 (i) placing the coated or enclosed product in water, preferably with agitation; and
 (ii) allowing the film to disperse, preferably in the presence of a surfactant, thereby releasing the product.

Viewed from a further aspect, the present invention provides a film-forming composition comprising a plant protein and polysaccharide, wherein the weight ratio of polysaccharide to plant protein is in the range 0.1:1 to 2:1, and wherein the plant protein has been pre-treated with an organic acid.

Viewed from a further aspect, the present invention provides a film obtained from a film-forming composition as hereinbefore described.

DETAILED DESCRIPTION OF THE INVENTION

The present invention describes films that are both robust and dispersible in water. The films of the present invention are therefore useful as packaging materials as they have the strength to withstand a manufacturing process and subsequent transportation and storage, but can then disperse upon contact with water, e.g. to release the product that has been packaged. Thus, the present invention provides a film comprising greater than or equal to 50 wt % of a combination of a plant protein and polysaccharide based upon the total weight of the film at 55% relative humidity and 22° C., wherein the weight ratio of polysaccharide to plant protein is in the range 0.1:1 to 2:1, and wherein the plant protein has been pre-treated with an organic acid.

In the films of the present invention, the weight ratio of polysaccharide to plant protein is in the range 0.1:1 to 2:1.

In preferred films of the present invention, the weight ratio of polysaccharide to plant protein is in the range 0.15:1 to 1.5:1, more preferably 0.2:1 to 1.3:1, even more preferably 0.5:1 to 1.2:1. The combination of a low level of plant protein with polysaccharide in these weight ratio ranges has been found to impart an increased strength to the film, without negatively impacting upon the ability of the film to disperse in water.

In order to determine the total protein content in a given sample of film, the soluble nitrogen-containing fraction contained can be quantitatively measured according to the Kjeldahl method, and then the total protein content can be obtained by multiplying the nitrogen content expressed as the weight percentage of the dried product by a factor of 6.25. This method is well known to those skilled in the art.

Total starch content in a given sample of film can be determined by standard methods AOAC Method 996.11 or AOAC Method 2014.10, which employ the combined action of α-amylase and amyloglucosidase to hydrolyse the starch to glucose, followed by glucose determination with a glucose oxidase/peroxidase reagent.

The method for determining the content of pullulan in a given sample of film follows the basic method described in CN114034595A with modification and comprises the following steps:

Step 1: Dispersion of the Pullulan-Containing Film Sample

A 3 g sample of film is dispersed in 100 ml DI water at 40° C. by agitating with an overhead stirrer at high speed for 20 mins so as to break the film sample into small fragments and dissolve the pullulan.

Step 2: Centrifugation and Separation of the Insoluble Fraction

Perform solid-liquid separation on the dispersed film sample by centrifuging at greater than 1000 g for 10 minutes and collect the supernatant liquid.

Step 3: Alcohol Precipitation

Add three times the volume of >95% purity ethanol to the supernatant liquid to precipitate the pullulan. Agitate well and leave for 30 minutes. Collect the solid precipitate by centrifugation at 1000 g for 5 minutes.

Step 4: Drying the Precipitate

Collect the precipitate from Step 3 and dry at 80° C. until the sample is at constant weight. The final constant weight is the amount of pullulan present in the original 3 g sample.

Preferred films of the present invention are monolayer films. An example of such a film is depicted graphically in FIG. 1a.

Alternative preferred films of the present invention are multilayer films. Thus, a preferred film of the present invention comprises:

a first layer comprising polysaccharide; and
a second layer comprising a plant protein, wherein the plant protein has been pre-treated with an organic acid;
wherein the second layer is in contact with a first surface of the first layer; wherein the film comprises greater than or equal to 50 wt % of a combination of a plant protein and polysaccharide based upon the total weight of the film at 55% relative humidity and 22° C.; and the weight ratio of polysaccharide to plant protein is in the range 0.1:1 to 2:1.

An example of such a multilayer film is depicted graphically in FIG. 1b, wherein layer (1) is the first layer and layer (2) is the second layer.

In preferred films of the present invention, the first layer further comprises a plant protein, wherein the plant protein has been pre-treated with an organic acid.

In preferred films of the present invention, the second layer further comprises polysaccharide.

In preferred films of the present invention, the first layer further comprises a plant protein, wherein the plant protein has been pre-treated with an organic acid, and the second layer further comprises polysaccharide. As would be understood by a skilled person, the weight ratio of polysaccharide to plant protein within each of the first and second layers may be the same or different. Preferably, the weight ratio of polysaccharide to plant protein within each of the first and second layers is different. More preferably, the weight ratio of polysaccharide to plant protein within the first layer is greater than the weight ratio of polysaccharide to plant protein within the second layer.

In preferred films of the present invention, the first layer has an onset melting temperature in the range of from 55° C. to 85° C., determined as described on p. 22 of the specification.

As would be understood by a skilled person, further layers may be added to the films of the present invention.

The films of the present invention comprise a plant protein. In preferred films of the present invention, the plant protein is selected from soybean protein, pea protein, rice protein, potato protein, wheat protein, rapeseed protein, sunflower protein and/or sorghum protein, preferably selected from pea protein, potato protein, rapeseed protein, sunflower protein and/or rice protein, more preferably pea protein.

In preferred films of the present invention, the plant protein is a protein from the Fabaceae family, preferably pea protein.

Preferred films of the present invention do not comprise soybean protein and/or wheat protein and/or sorghum protein.

In preferred films of the present invention, the plant protein source is a plant protein isolate, preferably pea protein isolate.

In preferred films of the present invention, the plant protein source is a plant protein concentrate.

In preferred films of the present invention, the plant protein source is a plant flour, preferably pea flour.

In preferred films of the present invention, the plant protein source is obtained from a waste stream, e.g. a waste stream from agricultural or food production.

Preferred films of the present invention comprise 2.0 to 40 wt % plant protein based upon the total weight of the film at 55% relative humidity and 22° C., preferably 2.5 to 35 wt %, more preferably 3.0 to 30 wt %.

An organic acid is an organic compound with acidic properties, preferably a carboxylic acid. In preferred films of the present invention, the organic acid used in the pre-treatment of the plant protein is selected from acetic acid, an α-hydroxy acid, or a β-hydroxy acid. More preferably, the organic acid is selected from acetic acid, lactic acid, citric acid, malic acid, maleic acid, glycolic acid, gluconic acid, tartaric acid, β-hydroxypropionic acid, β-hydroxybutyric acid, β-hydroxy β-methylbutyric acid, 2-hydroxybenzoic acid and carnitine, or a mixture thereof, preferably acetic acid.

In preferred films of the present invention, the organic acid used in the pre-treatment of the plant protein is a volatile organic acid (i.e. those having a boiling point of less than 120° C.), preferably acetic acid. This is because volatile organic acids can be easily removed from a film-forming composition during a casting or drying step, such that the final film contains little, if any, residual organic acid.

The films of the present invention display a useful combination of properties meaning that they are robust but still dispersible in water. Without wishing to be bound by theory, it is thought that the increased strength of the films of the present invention can be attributed to the pre-treatment of the plant protein with an organic acid. This is thought to be because the plant protein unfolds in the presence of an organic acid at high temperature, such that it is more available for interaction with the polysaccharide present, e.g. via hydrogen bonding. These increased protein-polysaccharide interactions reduce the level of retrogradation of the polysaccharide, this being the cause of brittleness in conventional polysaccharide-based films.

The pre-treatment of the plant protein with an organic acid results in the plant protein having a protein secondary structure with at least 40% intermolecular β-sheet, at least 50% intermolecular β-sheet, at least 60% intermolecular β-sheet, at least 70% intermolecular β-sheet, at least 80% intermolecular β-sheet, or at least 90% intermolecular β-sheet.

For the avoidance of doubt, the pre-treatment of the plant protein with organic acid takes place prior to mixing the plant protein with polysaccharide.

Preferably, the pre-treatment of the plant protein with organic acid involves the use of an aqueous organic acid solution. More preferably, the aqueous organic acid solution has a concentration of at least 5% (v/v), preferably at least 10% (v/v), more preferably at least 15% (v/v), more preferably at least 20% (v/v), more preferably at least 25% (v/v), more preferably at least 30% (v/v), more preferably at least 40% (v/v), even more preferably at least 50% (v/v). Alternatively, the aqueous organic acid solution has a concentration of no more than 90% (v/v), preferably no more than 80% (v/v), more preferably no more than 70% (v/v). Concentrated acid solutions are dangerous to be handled at large scale.

A polysaccharide is a carbohydrate polymer. Polysaccharides, or polycarbohydrates, are the most abundant carbohydrates found in food. They are long chain polymeric carbohydrates composed of monosaccharide units bound together by glycosidic linkages. This carbohydrate can react with water (hydrolysis) using amylase enzymes as catalyst, which produces constituent sugars (monosaccharides, or oligosaccharides). They range in structure from linear to highly branched. An example of a linear polysaccharide is pullulan. Starches consist essentially of amylose, which is linear, and/or amylopectin, which is branched, and in the native form are typically in the form of semi-crystalline granules. Sources of starch include but are not limited to fruits, seeds, and rhizomes or tubers of plants.

Some starches are classified as waxy starches. A waxy starch consists essentially of amylopectin and lacks an appreciable amount of amylose. Typical waxy starches include waxy maize starch, waxy rice starch, waxy potato starch, and waxy wheat starch.

Alternatively, some starches are classified as high amylose starches.

Modified starches are prepared by physically, enzymatically, or chemically treating native starch to change its properties. Starches may be modified, for example, by enzymes, by heat treatment, oxidation, or reaction with various chemicals.

In the films of the present invention, the starch may be a native starch or a modified starch, or a mixture thereof.

In preferred films of the present invention, the starch is selected from wheat starch, potato starch, pea starch, waxy potato starch, maize starch, waxy maize starch, high amylose maize starch, tapioca starch, cassava starch, rye starch, sorghum starch, chickpea starch, soy starch, or a mixture thereof, preferably potato starch.

In alternative preferred films of the present invention, the starch is a modified starch selected from acid-treated starch, dextrin, alkaline-modified starch, bleached starch, oxidized starch, enzyme-treated starch, maltodextrin, cyclodextrin monostarch phosphate, distarch phosphate, acetylated starch, hydroxypropylated starch, hydroxyethyl starch, starch sodium octenyl succinate, starch aluminium octenyl succinate or cationic starch, or a mixture thereof, preferably acid-treated starch.

Preferred films of the present invention comprise 30 to 70 wt % polysaccharide based upon the total weight of the film at 55% relative humidity and 22° C., preferably 40 to 65 wt %, more preferably 45 to 60 wt %.

Preferred films of the present invention comprise greater than or equal to 55 wt % of a combination of plant protein and polysaccharide based upon the total weight of the film at 55% relative humidity and 22° C., preferably greater than or equal to 60 wt %.

Preferred films of the present invention comprise less than or equal to 75 wt % of a combination of plant protein and polysaccharide based upon the total weight of the film at 55% relative humidity and 22° C., preferably less than or equal to 72 wt %, more preferably less than or equal to 70 wt %.

Preferred films of the present invention comprise 50 to 75 wt % of a combination of plant protein and polysaccharide based upon the total weight of the film at 55% relative humidity and 22° C., preferably 55% to 72 wt %, more preferably 60 to 70 wt %.

Preferred films of the present invention comprise 10 to 20 wt % water based upon the total weight of the film at 55% relative humidity and 22° C., preferably 10 to 15 wt %.

Preferred films of the present invention further comprise a plasticiser. Plasticisers are useful for improving film flexibility. Preferably, the plasticiser is selected from glycerol, polyethylene glycol, propylene glycol, sorbitol, mannitol, xylitol, triethyl citrate, fatty acids, glucose, mannose, fructose, sucrose, urea, lecithin, waxes, amino acids and organic acids (e.g. lactic acid, citric acid, glycolic acid, malic acid, gluconic acid or tartaric acid), or a mixture thereof, preferably glycerol.

As would be understood by a skilled person, an organic acid may be used in the pre-treatment of the plant protein and then remain to subsequently function as a plasticiser in the resultant film.

When the film is intended to package a foodstuff, the plasticiser must be suitable for human consumption. The preferred plasticisers mentioned above are all suitable for human consumption (i.e. they are food grade materials).

Preferred films of the present invention comprise 5 to 25 wt % plasticiser based upon the total weight of the film at 55% relative humidity and 22° C., preferably 10 to 20 wt %, more preferably 13 to 19 wt %.

Preferred films of the present invention comprise further a pigment or dye. Preferably, the pigment or dye is selected from azo-, quinophthalone-, triphenylmethane-, xanthene- or indigoid dyes; iron oxides or hydroxides; titanium dioxide; or natural dyes and mixtures thereof. Examples include patent blue V, acid brilliant green BS, red 2G, azorubine, ponceau 4R, amaranth, D+C red 33, D+C red 22, D+C red 26, D+C red 28, D+C yellow 10, yellow 2 G, FD+C yellow 5, FD+C yellow 6, FD+C red 3, FD+C red 40, FD+C blue 1, FD+C blue 2, FD+C green 3, brilliant black BN, carbon black, iron oxide black, iron oxide red, iron oxide yellow, titanium dioxide, riboflavin, carotenes, anthocyanines, turmeric, cochineal extract, chlorophyllin, canthaxanthin, caramel, betanin and Candurin® pearlescent pigments. More preferably, the pigment or dye is a food colourant, preferably a food colourant derived from plant sources, more preferably a food colourant selected from carotenoids, chlorophyllins, anthocyanins and betanin.

Preferred films of the present invention further comprise a structural reinforcement agent. The use of a structural reinforcement agent can help to improve the strength of the films. Preferably, the structural reinforcement agent is selected from cellulosic materials, including microcrystalline cellulose, micro-fibrillated cellulose including cellulose fibres extracted from the pulp of citrus fruits, microfibrous cellulose from fermentation, starch microcrystals, clays or a mixture thereof, preferably micro-fibrillated cellulose from citrus pulp.

Preferred films of the present invention comprise 0.5 to 5 wt % of said structural reinforcement agent based upon the total weight of the film at 55% relative humidity and 22° C., preferably 0.6 to 2.5 wt %.

Preferred films of the present invention further comprise a hydrophobic agent.

Preferably, the hydrophobic agent is a plant-based oil, preferably a non-volatile plant-based oil, which is preferably selected from vegetable oil, rapeseed oil, canola oil, soybean oil, sunflower oil, safflower oil, corn oil, and a flavour oil, or mixtures thereof, preferably vegetable oil. Examples of flavour oils include thyme oil, basil oil, olive oil, chili oil, rosemary oil, garlic oil, citrus oils or lavender oil.

Alternatively, the hydrophobic agent is a plant-based fatty acid, which is a saturated fatty acid or unsaturated fatty acid, or a mixture thereof. Preferably, the plant-based fatty acid is non-volatile. Preferred saturated fatty acids include caprylic acid, capric acid, lauric acid, myristic acid, palmitic acid, and stearic acid. Preferred unsaturated fatty acids include myristoleic acid, palmitoleic acid, oleic acid and linoleic acid.

Without wishing to be bound by theory, it is thought that the presence of a hydrophobic agent such as a plant-based oil or plant-based fatty acid in the films of the present invention improves the surface integrity of the films. This is thought to be because during the preparation of the film the hydrophobic agent moves to the top surface of the cast composition and thereby inhibits the early formation of a skin thereon, meaning that steam is able to more easily escape and that fewer bubbles are formed and trapped within the film once dry.

The use of a flavour oil as a hydrophobic agent in the films of the present invention offers the additional advantage that the films themselves can act as a flavour delivery means, e.g. when the film is used to package a foodstuff.

Preferred films of the present invention comprise 0.3 to 2.5 wt % of a hydrophobic agent based upon the total weight of the film at 55% relative humidity and 22° C., preferably 0.6 to 2.0 wt %, more preferably 0.7 to 1.5 wt %.

Preferred films of the present invention are suitable for human or animal consumption, i.e. the films are edible films. More preferably, the films of the present invention do not contain any ingredients derived from animal sources, making them suitable for consumption by vegetarians/vegans.

Preferred films of the present invention are digestible.

As used herein, edible refers to films that are digestible and would provide some nutritional benefit in themselves. This is in contrast to films which are safe to eat but which do not provide any nutrition themselves. An example of these latter films would be films made from HPMC, hydroxypropyl methyl cellulose, which is widely used in the pharmaceutical industry or other films based on cellulose. A characteristic of edible films is that they are inherently very rapidly biodegradable. Starch is often chemically modified to improve its cross-linking ability. Such approaches can be very effective at improving the physical properties of a starch but this very often reduces its digestibility and use as an edible material. Hence it is preferred if the starches used in these films have not been subjected to prior chemical modification other than hydrolysis.

Preferred films of the present invention do not contain chitosan.

The films of the present invention have a high dispersibility in water. This means that they can be used as a packaging material for a product that creates zero waste during end use of the product. For example, the films of the present invention could be used to package a detergent such that during the washing process the film will disperse in water to release the detergent. Alternatively, the films of the present invention could be used to package a foodstuff such that during the cooking process the film will disperse in water to release the foodstuff. Thus, in preferred films of the present invention, when 0.2 g of the film is boiled in water for 3 minutes with agitation and then poured through a 2 mm mesh sieve, 0.15 g or less of residue is collected on the sieve, preferably 0.1 g or less, more preferably 0.05 g or less. Advantageously, the residue is fully biodegradable meaning that the films do not have a negative impact on the environment.

In preferred films of the present invention, the pH of a dispersion of the film at a concentration of 1 g film in 10 g of deionised water at 25° C. is greater than 5, preferably greater than 5.5, more preferably greater than 6. This has the advantage that when the films are used to package a foodstuff the film, once dispersed, does not impart an acidic or otherwise negative taste to the foodstuff.

In preferred films of the present invention, the viscosity of a dispersion of the film at a concentration of 1 g film in 50 g of deionised water is less than 100 cps at 25° C. and 10 s$^{-1}$, preferably less than 90 cps at 25° C. and 10 s$^{-1}$, more preferably less than 80 cps at 25° C. and 10 s$^{-1}$. This has the advantage that the films, once dispersed, do not negatively affect the viscosity of the product, e.g. if the packaged product is a drink, the dispersed film will not cause the drink to become unduly thick and cause a negative consumer experience.

In preferred films of the present invention, the film has a tensile strength of 0.15 to 5 MPa as measured by ASTM D882-18 at 76% relative humidity and 5° C., preferably 0.17 to 3.5 MPa.

In preferred films of the present invention, the film has a break strain of 10 to 150% as measured by ASTM D882-18 at 76% relative humidity and 5° C., preferably 15 to 120%.

In preferred films of the present invention, the plant protein in the second layer has a secondary structure with at least 40% intermolecular β-sheet content, at least 50% intermolecular β-sheet content, at least 60% intermolecular β-sheet content, at least 70% intermolecular β-sheet content, at least 80% intermolecular β-sheet content, or at least 90% intermolecular β-sheet content, as measured by FTIR when the second layer is prepared on an inert surface, e.g. a glass surface.

In order to investigate the secondary structure of the plant protein in the second layer, Fourier-transform infrared (FTIR) analysis was performed. FTIR spectroscopy data were collected using FTIR VERTEX 70 spectrometer (Bruker) with a diamond attenuated total reflection (ATR) element.

The second layer comprising the plant protein needs to be in direct contact with the diamond ATR cell. The data was collected using 128 scans at 4 cm-1 resolution with background subtractions. For the structural analysis of proteins, the spectra were smoothed with a 2nd order and seven-point window Savitzky-Golay filter and normalized. The second derivative in the Amide I band (1600-1700 cm-1) was calculated from the smoothed data to deconvolve and quantify the secondary and quaternary structural contributions. In preferred films of the present invention, the biodegradation percentage based upon $O_2$ consumption of the film as measured according to ISO-14851 after 28 days is 70 to 100%, more preferably 80 to 100%, even more preferably 85 to 100%.

In preferred films of the present invention, the biodegradation percentage based upon $CO_2$ production of the film as measured according to ASTM D6691 after 28 days testing is 85 to 100%, more preferably 90 to 100%, even more preferably 95 to 100%.

In preferred films of the present invention, the film has a heat sealing strength of at least 40 N/m, preferably at least 60 N/m, more preferably at least 80 N/m, even more preferably at least 100 N/m, most preferably at least 120 N/m, as measured by ASTM F88/F88M-15 at 55% relative humidity and 20° C. after the film has been conditioned at 55% relative humidity and at 20° C. for at least one hour and then sealed at a temperature of 120° C. and a pressure of between 3 and 5 bar applied for a time of 1 second.

The present invention also provides a film comprising greater than or equal to 50 wt % of a combination of a plant protein and a polysaccharide based upon the total weight of the film at 55% relative humidity and 22° C., wherein the plant protein has been pre-treated with an organic acid, wherein the weight ratio of polysaccharide to plant protein is in the range 0.1:1 to 2:1, and wherein the film has a tensile strength of 0.15 to 5 MPa as measured by ASTM D882-18 at 76% relative humidity and 5° C. and/or a break strain of 10 to 150% as measured by ASTM D882-18 at 76% relative humidity and 5° C.

Preferred features of the film are as described above.

The present invention also provides a process for preparing a film as hereinbefore described, comprising the steps of:
(i) mixing the polysaccharide in water, optionally with sonication, to form a polysaccharide mixture;
(ii) dissolving or dispersing the plant protein in water and an organic acid, optionally with sonication, to form a protein solution;
(iii) mixing the polysaccharide mixture and the protein solution to form a film-forming composition; and
(iv) forming the film-forming composition into a film comprising greater than or equal to 50 wt % of a combination of a plant protein and polysaccharide based upon the total weight of the film at 55% relative humidity and 22° C., wherein the weight ratio of polysaccharide to plant protein is in the range 0.1:1 to 2:1.

In step (i), sonication will inherently heat a solution due to the sound energy applied.

In preferred processes of the present invention, the step (i) mixing is conducted at a temperature in the range 70 to 100° C., preferably 85 to 95° C.

In preferred processes of the present invention, the step (ii) dissolving is conducted at a temperature in the range 70 to 100° C., preferably 85 to 95° C.

In a preferred process of the present invention, organic acid is removed between steps (ii) and (iii).

In preferred processes of the present invention, the step (iii) mixing is conducted at a temperature in the range 70 to 100° C., preferably 85 to 95° C.

In preferred processes of the present invention, the step (iii) mixing is conducted at a temperature in the range 70 to 100° C., preferably 85 to 95° C.

In preferred processes of the present invention, steps (i), (ii) or (iii) further comprise sonication and/or ultrasound treatment.

In preferred processes of the present invention, step (iv) involves casting the film-forming composition onto a surface. Preferably, the surface is a pre-formed layer comprising polysaccharide or a pre-formed layer comprising a plant protein. Alternatively, the surface is a glass plate or other backing substance, like e.g. a PET carrier film. Alternatively, the surface is a moving belt, preferably a steel moving belt.

In preferred processes of the present invention, in step (iv) the film-forming composition is at a temperature in the range 50 to 95° C., more preferably 50 to 85° C.

In preferred processes of the present invention, the surface is heated. Preferably, the surface is heated to a temperature in the range 50 to 130° C., more preferably 55 to 100° C.

In preferred processes of the present invention, step (iv) further comprises heating the film in an oven, preferably at a temperature in the range 70 to 150° C.

In alternative preferred processes of the present invention, step (iv) involves extruding the film-forming composition through an orifice to form the film.

Preferred processes of the present invention further comprising an ageing step.

Preferably, said ageing step involves subjecting the film to a temperature of between 1° and 35° C. for a period of 1 week.

In a preferred process of the present invention, steps (i) to (iv) are repeated to produce a multilayer film. Thus, steps (i)-(iv) can be carried out to produce a first layer and then steps (i) to (iv) can be repeated to produce a second layer on a first surface of the first layer.

The present invention also provides a process for preparing a film as hereinbefore described, comprising the steps of:
(i) mixing the polysaccharide in water, optionally with sonication, to form a polysaccharide mixture;
(ii) forming the polysaccharide mixture into a first layer on a surface;
(iii) dissolving the plant protein in water and an organic acid, optionally with sonication, to form a protein solution; and
(iv) forming the protein solution into a second layer on a first surface of the first layer, so that the film comprises greater than or equal to 50 wt % of a combination of a plant protein and polysaccharide based upon the total weight of the film at 55% relative humidity and 22° C., the weight ratio of polysaccharide to plant protein being in the range 0.1:1 to 2:1.

In step (i), sonication will inherently heat a solution due to the sound energy applied In preferred processes of the present invention, the step (i) mixing is conducted at a temperature in the range 70 to 100° C., preferably 85 to 95° C.

In preferred processes of the present invention, step (i) further comprises sonication and/or ultrasound treatment.

In preferred processes of the present invention, step (ii) involves casting the polysaccharide mixture onto a surface. Preferably, the surface is a pre-formed layer comprising polysaccharide or a pre-formed layer comprising a plant protein.

Alternatively, the surface is a glass plate or other backing substance, like e.g. a PET carrier film. Alternatively, the surface is a moving belt, preferably a steel moving belt.

In preferred processes of the present invention, in step (ii) the polysaccharide mixture is at a temperature in the range 50 to 95° C., preferably 55 to 85° C.

In preferred processes of the present invention, the surface is heated. Preferably, the surface is heated to a temperature in the range 50 to 130° C., more preferably 55 to 100° C.

In preferred processes of the present invention, the step (iii) dissolving is conducted at a temperature in the range 70 to 100° C., preferably 85 to 95° C.

In preferred processes of the present invention, step (iii) further comprises sonication and/or ultrasound treatment.

In a preferred process of the present invention, organic acid is removed between steps (iii) and (iv).

In preferred processes of the present invention, step (iv) involves casting the protein solution onto the first surface of the first layer. Preferably, the first surface of the first layer is heated to a temperature in the range 50 to 95° C., more preferably 55 to 85° C.

In preferred processes of the present invention, in step (iv) the protein solution is at a temperature in the range 50 to 100° C., preferably 55 to 90° C.

The present invention also provides a product, preferably a foodstuff, coated with or enclosed by a film as hereinbefore described.

Preferably, the product is a foodstuff, a pharmaceutical product, a cleaning product, an agricultural product (e.g. an animal feed) or medication, a chemical product or a cosmetic product.

Preferably, the product is a solid product, a powdered product or a liquid product having a water activity of less than 50%.

The water activity of a material is the % equilibrium relative humidity of the material divided by 100. The % equilibrium relative humidity of a sample is measured by use of a humidity probe. Suitable equipment includes the Rotronics HC2-AW unit from Process Sensing Technologies and operated according to the instruction manual dated 31 Mar. 2016 or later. The unit should have been calibrated within one year of use according to the procedures using salt solutions as specified in the operation manual. The sample to be tested is placed in the sample cup and placed in the test unit. The humidity cell is then placed on the sample cup so as to seal the sample in the sample cup. The free water in the test sample then equilibrates with the air in the headspace above the sample and the final level of humidity in the headspace is measured by the HC2 unit and reported as % equilibrium relative humidity (eRH) at the test temperature. The % eRH is then divided by 100 to give the sample's water activity. The measurement should be carried out at temperatures between 20° C. and 25° C. to avoid temperature-dependent variability.

Preferably, the product is a solid product selected from a soup or flavouring preparation (e.g. a stock cube), a personal cleanser (e.g. a soap bar, body wash, body scrub or shampoo), a laundry detergent tablet or a dishwasher detergent tablet. More preferably, the product is a stock cube. Alternatively, the product is a laundry detergent tablet or a dishwasher detergent tablet.

Preferably, the product is a powdered product selected from a powdered food, a powdered drink, powdered milk, powdered soup, powdered hot chocolate, powdered coffee, soap flakes, and powdered shampoo. More preferably, the product is a powdered drink.

Preferably, the product is a non-aqueous liquid product which is an oil or a hair care product. More preferably, the product is a cooking oil.

The present invention also provides a method of coating or enclosing a product, preferably a foodstuff, comprising the steps of:
  (i) wrapping the product in a film as hereinbefore described; and
  (ii) sealing the film around the product.

Preferred products are as described above.

Preferably, step (ii) comprises heat sealing.

As would be understood by a skilled person, the sealing step requires contact between sections of film comprising polysaccharide. For example, a composite film comprising polysaccharide and plant protein can be sealed against another composite film comprising polysaccharide and plant protein, or to itself. However, if the film is a multilayer film comprising, for example, a polysaccharide layer and a plant protein layer, it is necessary to seal the polysaccharide layer to another film comprising polysaccharide, or to itself. This is because polysaccharide can melt (or gelatinise) at much lower temperatures compared to the plant protein. Residual water present in the polysaccharide layer also helps lower the melting (or gelatinisation) temperature of the polysaccharide.

In a preferred method of the present invention, the duration of step (ii) is less than 2 seconds, more preferably less than 1 second, most preferably less than 0.5 seconds.

In an alternative preferred method of the present invention, step (ii) is conducted at a temperature of less than 160° C., more preferably less than 140° C., most preferably less than 120° C.

The present invention also provides the use of a film as hereinbefore described to coat or enclose a product, preferably a foodstuff.

Preferred products are as described above.

The present invention also provides a sachet prepared by the method as hereinbefore described.

A preferred sachet of the invention does not stick to other sachets when kept in a high humidity environment.

The present invention also provides a method of releasing a product coated or enclosed with a film as hereinbefore described, comprising the steps of:
  (i) placing the coated or enclosed product in water; and
  (ii) allowing the film to disperse, thereby releasing the product.

Preferred products are as described above.

Alternatively, the product is released during a cooking process.

Preferably, the product is released during a washing process.

In preferred methods of the present invention, step (ii) further comprises mechanical agitation such as stirring or shaking.

The present invention also provides a film-forming composition comprising a plant protein and polysaccharide, wherein the weight ratio of polysaccharide to plant protein is in the range 0.1:1 to 2:1 and wherein the plant protein has been pre-treated with an organic acid.

Preferred features are as described above in relation to the films of the present invention.

The present invention also provides a film obtained from a film-forming composition as hereinbefore described.

Preferred features are as described above.

EXAMPLES

Materials

Figure 1A:
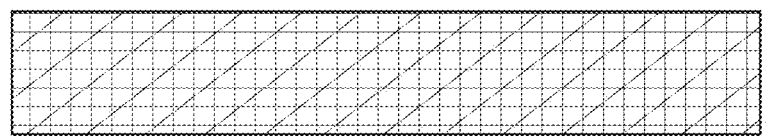
FIG. 1a is a graphical representation of a monolayer film of the present invention and FIG. 1b is a graphical representation of a multilayer film of the present invention.
Figure 1B:
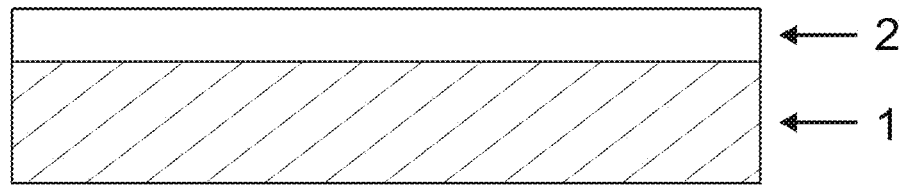

Pea Protein Isolate (PPI) (80 wt % protein, 4 wt % carbohydrate) (ProEarth P16109) was purchased from Cambridge Commodities Ltd.

Tapioca starch (Alpha Instant), potato starch (pre-gelled), maize starch and rice starch were purchased from BakeRite.

Maize amylopectin (starch from corn) and maltodextrin was purchased from Sigma-Aldrich Co.

Waxy maize starch (Ultratex) was purchased from Special Ingredients Ltd.

Food-grade glycerol (APC Pure) and potato starch (hot soluble) were purchased from APC.

Vegetable (rapeseed) oil was purchased from Tesco Ltd, UK.

Lactic acid (food-grade, >80%) was purchased from Cambridge Commodities Ltd.

Acetic acid (glacial, food grade) was purchased from Fisher Scientific.

Pullulan was purchased from Rongsheng Biotechnology Co. Ltd.

In the Examples that follow, all references to "ambient temperature" are to a temperature of approximately 20° C.

Measurement Methods

Dispersion Test in Water

A 0.2 g piece of film was placed in 600 mls of boiling water for 3 minutes with an overhead stirrer at 750 rpm positioned off-centre so that it does not touch the film. Observations were made as to the presence or absence of fragments in the water. After this time, the mixture was passed through a 2 mm mesh sieve. The appearance of the residue collected on the sieve, if any, was observed and noted. The fragments of film were carefully removed from the mesh using tweezers and the mass was measured.

Film Tensile Strength and/or % Elongation Test

Films were tested according to ASTM D882-18 Tensile Properties of Thin Plastic Sheeting using a Tinius Olsen 5ST tensile tester with a 100N load cell.

The films to be tested were cut into strips of 8.0 cm by 1.0 cm. The film thicknesses were measured by a micrometer (DML 3701P6 from RDM Test Equipment) at six points (three on each side of the strip being tested) and the results averaged to determine the average cross-sectional thickness. The strips were then conditioned to 76% relative humidity (RH) at 5° C. by leaving the films exposed within a humidity chamber at 76% RH/5° C. for at least 24 hours before testing to ensure they had reached equilibrium. Conditions were measured using commonly available devices such as the Fisherbrand™ Traceable™ Thermometer/Clock/Humidity Monitor. Such conditions are typical for a domestic fridge. Alternatively, the strips were conditioned to 55% relative humidity at 22° C. using the same method. Such conditions are typical of the humidity encountered in a room temperature packing and storage facility.

In order to test a film, the strip was removed from the humidity chamber and fixed by the parallel clamps of the 5ST test head with a 5 cm gap between the clamps. The upper clamp attached to the load cell was then moved upwards at a constant speed of 50 mm/minute to stretch the film until failure and the force exerted on the load cell recorded. This procedure happened within 1 minute of the film sample being withdrawn from the humidity chamber to minimise any changes in the condition of the film. The tensile strength is the force at failure divided by the average cross-sectional area of the film before conditioning and testing. The % Break Strain is calculated as (length of the film at failure−length of the initial film)/length of the initial film)×100.

Example 1: Preparation of Films

A monolayer film (E5) and multilayer films (E6-E14) were prepared according to the procedures described below. Five comparative films (C1-C5) were also prepared according to the procedures described below.

Preparation of Protein Monolayer Film C1

(i) Preparation of Protein Mixture 150 ml of deionised water was mixed with 37.5 g of Pea Protein Isolate in a 600 ml beaker at ambient temperature using an overhead stirrer to form a homogenous paste. 350 ml of acetic acid was then added with stirring along with 10.89 g of glycerol. The suspension was then sonicated (high intensity ultrasound) using a Bandelin Sonopuls HD4200 with a TS113 probe for 37 minutes and 30 seconds. The sonicator was set to an amplitude of 50%, with a cycle of 1 second on and 0.2 seconds off. The suspension was stirred intermittently throughout the sonication to ensure homogeneity.

(ii) Film Formation 25 ml of the mix was poured through a tea strainer to remove any remaining large lumps and into a 50 ml Falcon tube. The mix was then further degassed by removing large bubbles with a pipette and placing the Falcon tube in the ultrasound bath at 80° C. for 5 minutes. The mix was removed, allowed to cool to 55° C. and poured onto a flat glass plate having a Mylar surface. The liquid was spread out uniformly over the plate using a knife blade to give a wet film of the protein mix of 500 microns. The glass plate was then dried in an oven at 80° C. for 1 hr.

Preparation of Potato Starch Monolayer Film C2
(i) Preparation of Starch Mixture 50.0 g of potato starch was dispersed in 500 ml of deionised water at ambient temperature in a 600 ml beaker by overhead stirring. 21.43 g of glycerol was then added and the suspension stirred. The suspension was then sonicated (high intensity ultrasound) using a Bandelin Sonopuls HD4200 with a TS113 probe for 50 minutes at an amplitude of 95%, with a cycle of 1 second on, 0.2 seconds off. The suspension was stirred throughout the sonication to ensure homogeneity. The solution was then placed in a sonicator bath for 30 minutes at 80° C. to remove any bubbles.

(ii) Film Formation 25 ml of the solution was poured through a tea strainer to remove any remaining large lumps and into a 50 ml Falcon tube. The solution was then further degassed by removing large bubbles with a pipette and placing the Falcon tube in the ultrasound bath at 80° C. for 5 minutes. The mix was removed, allowed to cool to 55° C. and poured onto a flat glass plate having a Mylar surface. The liquid was spread out uniformly using a knife blade to give a wet film of the starch mix of 500 microns thickness. The plate was then put in the oven for 1 hr at 80° C. to form the dried film.

Preparation of Tapioca Starch Monolayer Film C3
(i) Preparation of Tapioca Starch Mixture 50.0 g of tapioca starch (STT) was dispersed in 500 ml of deionised water at ambient temperature in a 600 ml beaker by overhead stirring. 21.43 g of glycerol was then added and the suspension stirred. The suspension was then sonicated using a Bandelin sonicator for 50 minutes at an amplitude of 95%, with a cycle of 1 second on, 0.2 seconds off. The solution was then placed in a sonicator bath for 30 minutes at 80° C. to remove any bubbles.

(ii) Film Formation 25 ml of the solution was poured into a 50 ml Falcon tube. The solution was then further degassed by removing large bubbles with a pipette, before being allowed to cool to 55° C. and poured onto a flat glass plate having a Mylar surface. The liquid was spread out uniformly using a knife blade to give a wet film of the starch mix of 500 microns thickness. The plate was then put in the oven for 1 hr at 80° C. to form the dried film.

Preparation of Potato Starch and Pullulan Monolayer Film C4
(i) Preparation of Potato Starch and Pullulan Mixture 37.5 g of potato starch and 37.5 g of pullulan were dispersed in 500 ml of freshly boiled deionised water in a 600 ml beaker by overhead stirring. The solution was kept above 80° C. using a hot plate. 18.75 g of glycerol was then added and the mix stirred for a further 2 minutes.

(ii) Film Formation

The mix was then degassed under vacuum using a Flack-Tek Speedmixer. The mix was removed, allowed to cool to 55° C. and 25 ml poured onto a flat glass plate having a Mylar surface. The liquid was spread out uniformly using a knife blade to give a wet film of the starch mix of 300 microns thickness. The plate was then put in the oven for 1 hr at 80° C. to form the dried film.

Preparation of Protein-Starch Monolayer Film C5 (without Organic Acid Treatment Step)
(i) Preparation of Starch Mixture 11.25 g of Soluble Potato Starch was dispersed in 75 g of ambient temperature, deionised water in a 250 ml flask by stirring. 5.625 g of glycerol and 0.23 g of vegetable oil were then added and the suspension stirred. The suspension was then sonicated (high intensity ultrasound) using a Bandelin Sonopuls HD4200 with a TS113 probe for 7 minutes and 30 seconds. The sonicator was set to an amplitude of 95% amplitude, with a cycle of 1 second on and 0.2 seconds off. The suspension was stirred throughout the sonication to ensure homogeneity. There was no additional heating but the energy of the sonication raised the temperature of the mix to over 80° C. by the end of the sonication period. The mix was then placed in a heated ultrasound water bath for 30 minutes at 80° C. to allow the escape of trapped air bubbles.

(ii) Preparation of PPI Mixture 7.5 g of Pea Protein Isolate (PPI) was added to 100 g of water in a tall 250 ml beaker using an overhead stirrer to form a homogenous paste. The PPI mix was then sonicated (high intensity ultrasound) using a Bandelin Sonopuls HD4200 with a TS113 probe for 7 minutes and 30 seconds. The sonicator was set to an amplitude of 50%, with a cycle of 1 second on and 0.2 seconds off. The suspension was stirred intermittently throughout the sonication to ensure homogeneity.

(iii) Preparation of Protein-Starch Mixture 150 ml of the PPI mix from step (ii) and 0.54 g lactic acid were added to the starch mix from step (i). The combined mix was sonicated for 3 minutes using a Bandelin Sonopuls HD4200, at an amplitude of 50% with a cycle of 1 second on, 0.2 seconds off. The combined mix was then placed in an ultrasonic bath at 80° C. for 5 minutes to help remove air bubbles.

(iv) Film Formation 25 mL of the combined mix from step (iii) was poured through a tea strainer to remove any remaining large lumps and into a 50 ml Falcon tube. The mix was then further degassed by removing large bubbles with a pipette and placing the Falcon tube in the ultrasound bath at 80° C. for 5 minutes. The mix was removed, allowed to cool to 55° C. and poured onto a flat glass plate with a Mylar surface. The liquid was spread out uniformly over the plate using an RK K control coater model 101 with a knife edge to give a film of uniform thickness of 1000 microns. The glass plate was then placed in an oven at 80° C. for 1 hr. After this time, the film could be peeled off the Mylar surface ready for testing.

Preparation of Protein-Starch Monolayer Film E5
(i) Preparation of Starch Mixture 22.50 g of Soluble Potato Starch was dispersed in 150 g of ambient temperature, deionised water in a 250 ml flask by stirring. 5.625 g of glycerol and 0.23 g of vegetable oil were then added and the suspension stirred. The suspension was then sonicated (high intensity ultrasound) using a Bandelin Sonopuls HD4200 with a TS113 probe for 14 minutes and 15 seconds. The sonicator was set to an amplitude of 95%, with a cycle of 1 second on and 0.2 seconds off. The suspension was stirred throughout the sonication to ensure homogeneity. After the sonication, 0.54 g of lactic acid was added with stirring. There was no additional heating but the energy of the sonication raised the temperature of the mix to over 80° C. by the end of the sonication period. The mix was then placed in a heated ultrasound water bath for 30 minutes at 80° C. to allow the escape of trapped air bubbles.

(ii) Preparation of PPI Mixture 30 g of water was mixed with 7.5 g Pea Protein Isolate in a tall 250 ml beaker using an overhead stirrer to form a homogenous paste. 70 ml of acetic acid was then added with stirring along with 1.876 g of glycerol. The suspension was then sonicated (high intensity ultrasound) using a Bandelin Sonopuls HD4200 with a TS113 probe for 7 minutes and 30 seconds. The sonicator was set to an amplitude of 50%, with a cycle of 1 second on and 0.2 seconds off. The suspension was stirred intermittently throughout the sonication to ensure homogeneity.

(iii) Preparation of Protein-Starch Mixture 150 ml of the PPI mix from step (ii) and 0.54 g lactic acid were added to the total starch mix from step (i) to form a combined mix. The combined mix was sonicated for 3 minutes using a Bandelin Sonopuls HD4200, at an amplitude of 50% with a cycle of 1 second on, 0.2 seconds off. The combined mix was then placed in an ultrasonic bath at 80° C. for 5 minutes to help remove air bubbles.

(iv) Film Formation 25 mL of the combined mix from step (iii) was poured through a tea strainer to remove any remaining large lumps and into a 50 ml Falcon tube. The mix was then further degassed by removing large bubbles with a pipette and placing the Falcon tube in the ultrasound bath at 80° C. for 5 minutes. The mix was removed, allowed to cool to 55° C. and poured onto a flat glass plate with a Mylar surface. The liquid was spread out uniformly over the plate using an RK K control coater model 101 with a knife edge to give a film of uniform thickness of 1000 microns. The glass plate was then placed in an oven at 80° C. for 1 hr. After this time, the film could be peeled off the Mylar surface ready for testing.

Preparation of Potato Starch-Protein Multilayer Film E6

(i) Preparation of Starch Mixture 500 ml of deionised water was mixed with 50 g of potato starch in a 600 ml beaker at ambient temperature using an overhead stirrer. 21.43 g of glycerol was then added and the suspension stirred. The suspension was then sonicated (high intensity ultrasound) and processed according to the procedure described in step (i) of the preparation of the starch monolayer film C2.

(ii) Film Formation—Starch Layer 5 ml of the mix produced in step (i) was poured into a 50 ml Falcon tube. The mix was then further degassed by removing large bubbles with a pipette and placing the Falcon tube in the ultrasound bath at 80° C. for 5 minutes, before being removed and allowed to cool to 55° C. The liquid was poured onto a flat glass plate having a Mylar surface and was spread out uniformly over the plate using a knife blade to give a wet film of the starch mix of 100 microns. The glass plate was then put in the oven for 30 minutes at 80° C. to form the dried film layer.

(iii) Preparation of Protein Mixture 150 g of water was mixed with 37.5 g of Pea Protein Isolate (PPI) at ambient temperature in a 600 ml beaker using an overhead stirrer to form a homogenous paste. 350 ml of acetic acid and 10.89 g of glycerol were then added with stirring. The mix was then sonicated (high intensity ultrasound) and processed according to the procedure described in step (i) of the preparation of the protein monolayer film C1.

(iv) Film Formation—Protein Layer 25 ml of the mix produced in step (iii) was poured into a 50 ml Falcon tube. The mix was then degassed by removing large bubbles with a pipette, and placing the Falcon tube in the ultrasonic bath at 80° C. for 1 minute before being allowed to cool to 55° C. and then spread over the exposed surface (i.e. the surface not in contact with the glass plate) of the dried film prepared in step (ii) using a knife blade to give a wet film of the PPI mix of approximately 500 microns thickness. The plate was then put in the oven for 30 minutes at 80° C. to form the multilayer film.

Preparation of Potato Starch-Protein Multilayer Film E7

(i) Preparation of Starch Mixture

A starch mix was prepared according to the procedure in step (i) of the preparation of film E6.

(ii) Film Formation—Starch Layer 15 mL of the mix from step (i) was cast into a film according to step (ii) of the preparation of film E6, except that a wet film thickness of 300 microns was applied to Mylar surface of the glass plate. The film was left to dry at 80° C. for 30 minutes.

(iii) Preparation of Protein Mixture

A PPI mix was prepared according to the procedure in step (iii) of the preparation of film E6.

(iv) Film Formation—Protein Layer 25 ml of the mix from step (iii) was spread over the exposed surface of the dried film prepared in step (ii) according to step (iv) of the preparation of film E6.

Preparation of Potato Starch-Protein Multilayer Film E8

(i) Preparation of Starch Mixture

A starch mix was prepared according to the procedure in step (i) of the preparation of film E6.

(ii) Film Formation—Starch Layer 5 mL of the mix from step (i) was cast into a film according to step (ii) of the preparation of film E6.

(iii) Preparation of Protein Mixture

A PPI mix was prepared according to the procedure in step (iii) of the preparation of film E6.

(iv) Film Formation—Protein Layer 45 ml of the mix from step (iii) was spread over the exposed surface of the dried film prepared in step (ii) according to step (iv) of the preparation of film E6, except that a wet film thickness of 900 microns was applied. The film was left to dry at 80° C. for 60 minutes.

Preparation of Potato Starch-Protein Multilayer Film E9

(i) Preparation of Starch Mixture

A starch mix was prepared according to the procedure in step (i) of the preparation of film E6.

(ii) Film Formation—Starch Layer 25 mL of the mix from step (i) was cast into a film according to step (ii) of the preparation of film E6, except that a wet film thickness of 500 microns was applied to Mylar surface of the glass plate. The film was left to dry at 80° C. for 60 minutes.

(iii) Preparation of Protein Mixture

A PPI mix was prepared according to the procedure in step (iii) of the preparation of film E6.

(iv) Film Formation—Protein Layer 25 ml of the mix from step (iii) was spread over the exposed surface of the dried film prepared in step (ii) according to step (iv) of the preparation of film E6.

Preparation of Potato Starch/Pullulan-Protein Multilayer Film E10

(i) Preparation of Starch/Pullulan Mixture 37.5 g of potato starch and 37.5 g of pullulan were dispersed in 500 ml of freshly boiled deionised water in a 600 ml beaker by overhead stirring. The solution was kept above 80° C. using a hot plate. 18.75 g of glycerol was then added and the mix stirred for a further 2 minutes.

(ii) Film Formation—Starch/Pullulan Layer 25 mL of the mix from step (i) was degassed under vacuum using a FlackTek Speedmixer, allowed to cool to 55° C. and poured onto a flat glass plate having a Mylar surface. The liquid was spread out uniformly over the plate using a knife blade to give a wet film of the starch/pullulan mix of 300 microns. The film was left to dry at 80° C. for 30 minutes.

(iii) Preparation of Protein Mixture

A PPI mix was prepared according to the procedure in step (iii) of the preparation of film E6.

(iv) Film Formation—Protein Layer 25 ml of the mix from step (iii) was spread over the exposed surface of the dried film prepared in step (ii) according to step (iv) of the preparation of film E6.

Preparation of Tapioca Starch-Protein Multilayer Film E11

(i) Preparation of Starch Mixture 25.0 g of tapioca starch was dispersed in 200 ml of deionised water at ambient temperature in a 400 ml beaker by overhead stirring. 6.25 g of glycerol was then added and the suspension stirred. The suspension was then sonicated (high intensity ultrasound) using a Bandelin Sonopuls HD4200 with a TS113 probe for 25 minutes at an amplitude of 95%, with a cycle of 1 second on, 0.2 seconds off. The suspension was stirred throughout the sonication to ensure homogeneity. The solution was then placed in a sonicator bath for 30 minutes at 80° C. to remove any bubbles.

(ii) Film Formation 12.5 ml of the solution was poured into a 50 ml Falcon tube. The solution was then further degassed by removing large bubbles with a pipette and placing the Falcon tube in the ultrasound bath at 80° C. for 5 minutes. The mix was removed, allowed to cool to 55° C. and poured onto a flat glass plate having a Mylar surface. The liquid was spread out uniformly using a knife blade to give a wet film of the starch mix of 200 microns thickness. The plate was then put in the oven for 30 minutes at 80° C. to form the dried film.

(iii) Preparation of Protein Mixture 60 ml of water was mixed with 16 g of Pea Protein Isolate (PPI) at ambient temperature in a 400 ml beaker using an overhead stirrer to form a homogenous paste. 140 ml of acetic acid and 6.86 g of glycerol were then added with stirring. The suspension was then sonicated (high intensity ultrasound) using a Bandelin Sonopuls HD4200 with a TS113 probe for 15 minutes. The sonicator was set to an amplitude of 50%, with a cycle of 1 second on and 0.2 seconds off. The suspension was stirred intermittently throughout the sonication to ensure homogeneity.

(iv) Film Formation—Protein Layer 20 ml of the mix produced in step (iii) was poured into a 50 ml Falcon tube. The mix was then degassed by removing large bubbles with a pipette, and placing the Falcon tube in the ultrasonic bath at 80° C. for 1 minute before being allowed to cool to 55° C. and then spread over the exposed surface (i.e. the surface not in contact with the glass plate) of the dried film prepared in step (ii) using a knife blade to give a wet film of the PPI mix of approximately 400 microns thickness. The plate was then put in the oven for 30 minutes at 80° C. to form the multilayer film.

Preparation of Tapioca Starch/Protein Monolayer Film E12

50 ml of the mix produced in step (i) of E11 was added to 100 ml of the mix produced in step (iii) of E11 in a 250 ml beaker using an overhead stirrer at ambient temperature to form a homogeneous mixture. The mix was placed in a sonicator bath for 5 minutes at 80° C. to remove the bubbles. 30 ml of the mix was poured into a 50 ml Falcon tube. The mix was removed, poured onto a flat glass plate having a Mylar surface and spread out uniformly using a knife blade to give a wet film of the protein-starch blend of 600 microns. The glass plate was then dried in the oven at 80° C. for 1 hour to form the dried film.

Preparation of Starch-Protein Multilayer Film E13

(i) Preparation of Starch Mixture 2000 ml of deionised water at ambient temperature was mixed with 85.7 g of glycerol, in a Klarstein food processor (Grand Prix Chef Edition). 200 g of potato starch was then added whilst starting the program: Temperature 85° C., Speed 4, 45 mins. The batch was then moved to a VEVOR vacuum chamber connected to a ¼ hp 3 cfm single stage vacuum pump for degassing. The material was poured in the container, which was then sealed, and the vacuum pump operated for 5-10 min until the slurry was free of air bubbles.

(ii) Film Formation—Starch Layer

The casting of the starch layer took place using a standard roll to roll machine including a pressure vessel, a fluid pump, a slot die unit, a feeding roller, a web traversing a series of rollers and load cells that allowed tension control, a drying oven of approximately 2 meters length and a winding roller. The backing used for this casting was a standard 72 μm PET roll. The starch mixture prepared in (i) was poured into the pressure vessel and then tightly closed making sure there were no leaks. The vessel was then pressurised to 1-2 bar and the starch mixture was pumped through the progressive cavity pump to feed the slot die. The equipment was set to the following parameters:

Oven temperature: 100-140° C.
Line speed: 0.4-1 m/min
Slot die width: 300 mm
Fluid pump flow: 50-120 ml/min
Slot die distance from backing: 0.2-0.4 mm
Shim distance between slot lips: 150-200 μm The wet thickness was varied between 300 and 550 μm and was tuned to approximately 350 μm by adjusting the parameters. The film came out of the oven dry and the resulting roll was then moved from the collection winder and placed as the feed roll so that a second film could be cast on top of it.

(iii) Preparation of Protein Mixture 740 g of water was mixed with 94.4 g of Pea Protein Isolate (PPI) in a tall 1000 ml beaker using an overhead stirrer to form a homogenous slurry. 60 g of acetic acid and 23.6 g of glycerol were then added while stirring. The mix was placed in a 90° C. water bath for 20-30 min with shaking every 10 min. Following this step, the slurry was transferred to a Hielscher 1 kW sonicator (with booster) and an energy total of 200 kJ was applied with shaking every ~30 min. Sonication took approximately 30 mins to reach the target energy. The process was repeated 3 times to produce a total of 2400 ml of product which was then degassed using a using a Flacktek Speedmixer from Synergy with the settings of 3-5 min, 2000 rpm; 50 mBars.

(iv) Film Formation—Protein Layer

The coating equipment as described in step (ii) was used for this layer; however, the backing already had the first layer of starch coated on it. The protein mixture prepared in step (iii) was poured in the pressurized vessel and the coater was set to the following parameters:

Oven temperature: 100-130° C.
Line speed: 0.7-1 m/min
Slot die width: 300 mm
Fluid pump flow: 40-120 ml/min
Slot die distance from backing: 0.2-0.25 mm
Shim distance between slot lips: 150-200 μm The multilayer film came out of the oven dry and showed minimal bubbles and/or imperfections. Each of the two layers had a thickness of approximately 30 μm.

Preparation of Starch-Protein Multilayer Film E14

(i) Preparation of Starch Mixture

A starch mix was prepared according to the procedure described in step (i) of the preparation of film E13.

(ii) Film Formation—Starch Layer 2000 ml of the batch described in step (i) was cast into a roll of film according to the procedure described in step (ii) of the preparation of film E13.

(iii) Preparation of Protein Mixture 1200 g of deionised water was measured and poured into a large 3 L stainless steel vessel. The vessel was placed in a water bath set at 95° C. and an overhead stirrer with an impeller blade was used to mix the water at 900 rpm. 320 g of pea protein isolate was added to the mixture and left to stir for 3 min until a homogenous mix was formed. 800 g of acetic acid was measured and poured into the mix which was stirred at 700 rpm for 40 min. The temperature of the mix was measured to ensure it had reached 85° C. and if necessary, the stirring continued to ensure that the mix had reached 85° C. for at least 10 min. Following that, the mix was sheared using a Silverson high shear homogeniser at 7000 rpm for 3 min.

The freshly shear mixed slurry was then poured into plastic flat containers or large petri dishes to an approximate height of 10 mm. The containers were then sealed and stored in a fridge for 16-28 hours.

After storage, the gel that formed was cut into 1 cm×1 cm squares and using a spatula, the gel cubes were transferred in a 75 μm filter bag. The bag was then suspended with the gel cubes in a bucket containing 6 l of reverse osmosis water. After 1 h 30 min, 3 l of water were removed and replaced with 3 l of fresh reverse osmosis water. The bag and gel cubes were left in the water and swirled every 20 min for 90-150 min. The pH was measured and if below 2.9 then the previous two steps were repeated until the pH reached values above 2.9.

The filter bag was then raised from the water and squeezed vigorously to remove as much excess water as possible. The slurry was then transferred to a 1 l container and using an Ultra-Turrax mixer the gel mush was sheared at 15000 rpm for 15 min with shaking every 5 min. 21.71 g of glycerol was then added to the mixture followed by another 5 min of Ultra-Turrax mixing at 15000 rpm. The container was then placed in an ice bath and the mix was sonicated with a Hielschler sonicator until 0.25 kJ/ml was achieved. The slurry was filtered through a 212 μm mesh and stored in plastic buckets.

(iv) Film Formation—Protein Layer 2000 ml of the mixture prepared in step (iii) was poured in the pressurised vessel of the coater described in step (iv) of film E13. The following parameters were used to set up the equipment:

Oven temperature: 100-115° C.
Line speed: 0.5-0.9 m/min
Slot die width: 300 mm
Fluid pump flow: 50-90 ml/min
Slot die distance from backing: 0.15-0.2 mm
Shim distance between slot lips: 150-200 μm The multilayer film came out of the oven dry and showed minimal bubbles and/or imperfections. Each of the two layers had a thickness of approximately 30 μm.

The compositions of each of the prepared films are shown in Table 1.

TABLE 1

(misc = insoluble fibres)

| Film No. | Film type | Film composition, % wt | | Polysaccharide to Protein weight ratio |
|---|---|---|---|---|
| C1: Protein Monolayer | Mono-layer | Protein | 54.90 | 0.05:1 |
| | | Total starch | 2.75 | |
| | | Pullulan | 0.00 | |
| | | Glycerol | 19.93 | |
| | | Acetic acid | 3.20 | |
| | | Water | 8.24 | |
| | | Misc | 10.98 | |
| C2: Potato starch monolayer | Mono-layer | Protein | 0.00 | N/A |
| | | Total starch | 57.85 | |
| | | Pullulan | 0.00 | |
| | | Glycerol | 24.79 | |
| | | Acetic acid | 0.00 | |
| | | Water | 17.36 | |
| | | Misc | 0.00 | |
| C3: Tapioca starch monolayer | Mono-layer | Protein | 0.00 | N/A |
| | | Total starch | 57.85 | |
| | | Pullulan | 0.00 | |
| | | Glycerol | 24.79 | |
| | | Acetic acid | 0.00 | |
| | | Water | 17.36 | |
| | | Misc | 0.00 | |
| C4: Starch/Pullulan monolayer | Mono-layer | Protein | 0.00 | N/A |
| | | Total starch | 34.48 | |
| | | Pullulan | 34.48 | |
| | | Glycerol | 17.24 | |
| | | Acetic acid | 0.00 | |
| | | Water | 13.79 | |
| | | Misc | 0.00 | |
| C5: Potato starch-protein monolayer with no acid treatment | Mono-layer | Protein | 25.3 | 1.3:1 |
| | | Total starch | 32.8 | |
| | | Vegetable oil | 0.6 | |
| | | Glycerol | 15.8 | |
| | | Lactic acid | 1.5 | |
| | | Acetic acid | 0.0 | |
| | | Water | 18.9 | |
| | | Misc | 5.1 | |
| E5: Potato starch-protein monolayer | Mono-layer | Protein | 27.3 | 1.3:1 |
| | | Total starch | 35.5 | |
| | | Vegetable oil | 0.7 | |
| | | Glycerol | 17.0 | |
| | | Lactic acid | 1.6 | |
| | | Acetic acid | 1.6 | |
| | | Water | 10.9 | |
| | | Misc | 5.5 | |
| E6: Potato starch-protein multilayer | Multi-layer | Protein | 45.75 | 0.26:1 |
| | | Total starch | 11.93 | |
| | | Pullulan | 0.00 | |
| | | Glycerol | 20.74 | |
| | | Acetic acid | 2.67 | |
| | | Water | 9.76 | |
| | | Misc | 9.15 | |
| E7: Potato starch-protein multilayer | Multi-layer | Protein | 34.32 | 0.68:1 |
| | | Total starch | 23.41 | |
| | | Pullulan | 0.00 | |
| | | Glycerol | 21.75 | |
| | | Acetic acid | 2.00 | |
| | | Water | 11.66 | |
| | | Misc | 6.86 | |
| E8: Potato starch-protein multilayer | Multi-layer | Protein | 49.41 | 0.17:1 |
| | | Total starch | 8.26 | |
| | | Pullulan | 0.00 | |
| | | Glycerol | 20.42 | |
| | | Acetic acid | 2.88 | |
| | | Water | 9.15 | |
| | | Misc | 9.88 | |
| E9: Potato starch-protein multilayer | Multi-layer | Protein | 27.45 | 1.1:1 |
| | | Total starch | 30.30 | |
| | | Pullulan | 0.00 | |
| | | Glycerol | 22.36 | |
| | | Acetic acid | 1.60 | |
| | | Water | 12.80 | |
| | | Misc | 5.49 | |
| E10: Starch/pullulan-protein multilayer | Multi-layer | Protein | 34.32 | 0.80:1 |
| | | Total starch | 14.65 | |
| | | Pullulan | 12.93 | |
| | | Glycerol | 18.92 | |
| | | Acetic acid | 2.00 | |

TABLE 1-continued (misc = insoluble fibres)

| Film No. | Film type | Film composition, % wt | | Polysaccharide to Protein weight ratio |
|---|---|---|---|---|
| E11: Tapioca starch-protein multilayer | Multi-layer | Water | 10.32 | 0.71:1 |
| | | Miso | 6.86 | |
| | | Protein | 33.65 | |
| | | Total starch | 24.05 | |
| | | Pullulan | 0.00 | |
| | | Glycerol | 23.63 | |
| | | Acetic acid | 1.84 | |
| | | Water | 10.10 | |
| | | Misc | 5.82 | |
| E12: Tapioca starch/protein blend monolayer | Mono-layer | Protein | 33.65 | 0.71:1 |
| | | Total starch | 24.05 | |
| | | Pullulan | 0.00 | |
| | | Glycerol | 23.63 | |
| | | Acetic acid | 1.84 | |
| | | Water | 10.10 | |
| | | Misc | 6.73 | |
| E13: Potato starch-protein low organic acid multilayer | Multi-layer | Protein | 26.88 | 1.1:1 |
| | | Total starch | 30.27 | |
| | | Glycerol | 20.80 | |
| | | Lactic acid | 0.00 | |
| | | Acetic acid | 0.11 | |
| | | Water | 16.58 | |
| | | Misc | 5.38 | |
| E14: Potato starch-protein low organic acid multilayer | Multi-layer | Protein | 32.85 | 0.88:1 |
| | | Total starch | 28.93 | |
| | | Glycerol | 22.21 | |
| | | Lactic acid | 0.00 | |
| | | Acetic acid | 0.06 | |
| | | Water | 15.95 | |
| | | Misc | 0.00 | |

Example 2: Determination of Onset Melting Temperature and Sealing Strength for Polysaccharide Monolayers (i) Preparation of Polysaccharide Monolayers 10.0 g of polysaccharide was dispersed in 100 ml of deionised water at ambient temperature, in a 250 ml flask by overhead stirring. 4.29 g of glycerol was then added and the suspension stirred. The suspension was then sonicated using a Bandelin sonicator for 10 minutes at an amplitude of 95%, with a cycle of 1 second on, 0.2 seconds off. The solution was then placed in a sonicator bath for 1 min at 80° C. to remove any bubbles.

20 ml of the solution was poured into a 50 ml Falcon tube. The solution was then further degassed by removing large bubbles with a pipette, before being allowed to cool to 55° C. and poured onto a flat glass plate having a Mylar surface. The liquid was spread out uniformly using a knife blade to give a wet film of approximately 400 microns thickness. The plate was then put in the oven for 50 minutes at 80° C. to dry the layer of film.

(ii) Measurement of Onset Melting Temperature by Differential Scanning Calorimetry (DSC)

The films produced in step (i) were conditioned overnight at 55% relative humidity and 20° C. The onset melting temperature is a function of the whole film composition including moisture level. A small test sample (10-20 mg) was cut from each film and accurately weighed. Each sample was placed in 40 μL aluminium pans (#51119870, purchased from Mettler Toledo), and heated from 25° C. to 160° C. at a heating rate of 10° C./min in a nitrogen atmosphere using a DSC822e from Mettler Toledo. The pan lid was pierced using a 50 μm diameter needle prior to the sealing. An empty pan was used as a reference. The normalised heat flow was recorded and plotted as a function of temperature.

The onset melting point of a sample is defined as the first inflection point in the DSC curve showing a rate increase in the heat flow to the sample with increasing temperature. As the sample starts to melt, the heat flow to the sample increases, thus creating a change of gradient and an inflection point in the graph.

Normalised heat flow plots can be visually assessed by an operator to determine the inflection point in the graph. However, this analysis is now typically done using software analysis tools. Such analysis tools are typically included as part of the equipment operating system. Suitable software includes the STARe evaluation software supplied by Mettler-Toledo.

Data from the normalised DSC plots obtained above was analysed using the STARe evaluation software version 16.30 to determine onset melting temperatures. Results are shown in Table 1 below. The thermal properties of a starch mixture are a complex combination of the relative ratio of amylose to amylopectin in the starch, prior thermal treatments and the level and nature of other ingredients.

TABLE 1

| Polysaccharide | Plasticiser | Onset melting temperature, ° C. |
|---|---|---|
| Tapioca starch - Alpha Instant (STT) | Glycerol | 67.3 |
| Maize amylopectin (AMP) | Glycerol | 73.6 |
| Hot soluble potato starch (APC) | Glycerol | 78.8 |
| Pre-gelled potato starch (BPS) | Glycerol | 78.5 |
| Ultratex waxy maize starch (CSS) | Glycerol | 122.1 |
| Maize starch (SMA) | Glycerol | 78.2 |
| Rice starch (SRX) | Glycerol | 73.5 |
| Pullulan | Glycerol | 61.0 |
| Pullulan + Hot soluble potato starch (APC) | Glycerol | 77.5 |
| Maltodextrin | Glycerol | 72.5 |

(iii) Determination of Sealing Strength

Test samples of some of the layers produced in step (i) were prepared and subjected to a seal strength measurement. Test samples of width 25 mm were cut to the dimensions given in ASTM F88/F88M-15 and conditioned overnight at 55% RH and 20° C. Test strip samples were then sealed using an RDM heat sealer to give a fin seal. Sealed test specimens were tested using technique A (unsupported) in a Tinnius Olsen tensile tester. A sealing temperature of 100° C. and a dwell time of 1 second were employed. The results are shown in Table 2 below.

TABLE 2

| Starch | Plasticiser | Onset melting temperature, ° C. | Maximum heat sealing strength @ 100° C., 1 sec dwell, N/m |
|---|---|---|---|
| STT | Glycerol | 67.3 | 544.0 |
| BPS | Glycerol | 78.5 | 189.2 |
| CSS | Glycerol | 122.1 | 12.8 |

As demonstrated above, the onset melting temperature of a material relates inversely to its ability to form a strong seal. For example, the STT-based layer has a low onset temperature and forms a strong seal. The BPS-based layer has a slightly higher onset temperature and also forms a strong seal. However, the CSS-based layer has a much higher onset temperature and consequently forms a seal with a much lower sealing strength.

A lower onset temperature for the polysaccharide-containing layer of the multilayer films of the present invention is advantageous for multiple reasons. Not only has it been demonstrated that a stronger seal strength can be achieved, but a lower onset temperature means that a lower temperature need be applied to the external alginate-containing layer of the multilayer films of the present invention in order to result in effective sealing of the internal polysaccharide-containing layer. This means that the film degradation (e.g. as a result of burning) is avoided, and also that shorter dwell times are required to form the seal, making the sealing process more industrially viable.

Example 3: Measurement of Film Tensile Strength and Elongation

Rectangular test samples of length 80 mm and width 10 mm were cut (which falls within the described specifications in ASTM D882) and conditioned overnight at 55% RH and 22° C. The test samples were tested using a Tinnius Olsen tensile tester with flat grip inserts, an initial grip separation of 50 mm and a testing speed of 50 mm/min (strain rate of 1 mm/mm·min).

Utmost care was exercised in cutting specimens to prevent nicks and tears that cause premature failures and ensure repetitive sample quality.

The results are shown in Table 3 below. Tensile strength was reported in MPa and elongation at break in %.

TABLE 3

| Film | Tensile strength (MPa) | Elongation at break (%) |
| --- | --- | --- |
| C1: Protein monolayer | 6.17 | 97.6 |
| C2: Potato starch monolayer | 1.22 | 64.0 |
| C3: Tapioca starch monolayer | 1.80 | 50.4 |
| C4: Starch/Pullulan monolayer | 3.63 | 112.5 |
| C5: Potato starch - protein monolayer with no acid treatment | N/A | N/A |
| E5: Potato starch - protein monolayer | 3.42 | 129.0 |
| E6: Potato starch - protein multilayer | 6.00 | 78.5 |
| E7: Potato starch - protein multilayer | 6.40 | 90.6 |
| E8: Potato starch - protein multilayer | 3.94 | 95.6 |
| E9: Potato starch - protein multilayer | 2.97 | 85.4 |
| E10: Starch/pullulan-protein multilayer | 4.73 | 70.3 |
| E11: Tapioca starch-protein multilayer | 3.35 | 78.6 |
| E12: Tapioca starch/protein blend monolayer | 2.30 | 14.7 |
| E13: Potato starch - protein low organic acid multilayer | 8.30 | 18.7 |
| E14: Potato starch - protein low organic acid multilayer | 8.84 | 29.6 |

A protein monolayer film (C1) had higher tensile strength than polysaccharide monolayer films (C2, C3, C4), as expected.

A potato starch monolayer film (C2) had very low tensile strength making it unsuitable for industrial application as a film. However, a monolayer film made from a mixture of potato starch and organic acid-treated protein (E5) had good tensile strength and % break strain, resulting in a film which was robust and could be easily handled.

The equivalent monolayer film where the protein had not been treated with acid (C5) resulted in a film that cracked upon drying and did not produce a viable film that could not be tested for tensile strength or elongation.

A tapioca starch monolayer film (C3) had very low tensile strength making it unsuitable for industrial application as a film. However blending low levels of tapioca starch with the protein as a monolayer film (E12) resulted in lowering of the protein tensile strength and elongation, however this was still of an acceptable level for handling and making into sachets. The equivalent multilayer film (E11) had less of a drop in tensile strength or elongation than the monolayer film.

Multilayers with various polysaccharides (potato starch, tapioca starch, pullulan) at various ratios all had good tensile strength and elongation (E6, E7, E8, E9, E10, E11).

Multilayer films with lower levels of organic acid (E13 and E14) resulted in films with very good tensile strengths.

Example 4: Measurement of Seal Strength

Test samples of width 25 mm were cut to the dimensions given in ASTM F88/F88M-15 and conditioned overnight at 55% relative humidity and 20° C. Test strip samples were then sealed using an RDM heat sealer to give a fin seal. Sealed test specimens were tested using technique A (unsupported) in a Tinnius Olsen tensile tester. A sealing temperature of 120° C. and a dwell time of 1 second and pressure of between 3 and 5 bar were employed. It is well known that the sealing pressure has negligible effect on the sealing strength. The results are shown in Table 4 below. The maximum force encountered as each specimen was stressed to failure is reported as Newtons/meter (N/m).

TABLE 4

| Film | Film thickness (μm) | Heat sealing maximum force/ width (N/m) |
| --- | --- | --- |
| C1: Protein monolayer | 72 | 0 |
| C2: Potato starch monolayer | 51 | 113 |
| C3: Tapioca starch monolayer | 112 | 196 |
| C4: Starch/Pullulan monolayer | 78 | 436 |
| E6: Potato starch - protein multilayer | 53 | 64 |
| E7: Potato starch - protein multilayer | 99 | 48 |
| E8: Potato starch - protein multilayer | 99 | 84 |
| E9: Potato starch - protein multilayer | 94 | 132 |
| E10: Starch/pullulan-protein multilayer | 90 | 504 |
| E11: Tapioca starch-protein multilayer | 73 | 200 |
| E12: Tapioca starch/protein blend monolayer | 81 | 37 |

As expected protein monolayer film C1 did not heat seal.

Polysaccharide monolayer films C2, C3 and C4 had very high heat sealing strengths.

A blend of tapioca starch and protein monolayer film (E12) has a lower seal strength compared to a tapioca starch monolayer film (C3) but this is still acceptable for forming sachets in an industrial process. The same composition prepared as a multilayer (E11) is preferred as it maintains the high sealing strength of tapioca starch monolayer (C3).

Starch-pullulan: protein multilayers (E10) maintain the excellent high seal strength of starch-pullulan monolayer (C4).

Potato starch: protein multilayers have acceptable sealing even with very low levels of starch (E6, E7, E8, E9).

The protein/starch multilayer E6 (having a film thickness of 67 μm, and conditioned and stored at 55% relative humidity and a temperature of 20° C.) was taken on for further seal strength testing, at different seal temperatures with a dwell time of 1 s and pressure of 5 bar. The results for average and maximum seal strength are shown in Table 5 below.

TABLE 5

| | Temperature (° C.) | Average Seal Strength (N/m) | Maximum Seal Strength (N/m) |
|---|---|---|---|
| Film E6 | 120 | 64.6 | 240.0 |
| | 125 | 62.4 | 238.4 |
| | 130 | 88.8 | 327.2 |
| | 135 | 82.0 | 310.4 |
| | 140 | 76.0 | 220.8 |
| | 150 | 46.8 | 102.0 |

For this film composition there was an ideal heat-sealing temperature of 130° C. where the average and maximum seal strengths reach a maximum. At lower temperatures there was not sufficient heat for the starch to gelatinise and form a good seal. At high temperatures the materials started to degrade and the sealing strengths were reduced.

Example 5: Dispersion of Dishwasher Tablet Sachet

Sachets were produced using the multilayer film E7, by heat sealing along the length and ends of the film with an RS PRO heat sealer on power 2. The sealed sachets contained a commercial dishwasher Finish® tablet from Reckitt Benckiser previously wrapped with PVOH. The sachets could be easily handled and maintained their integrity.

Figure 2A:
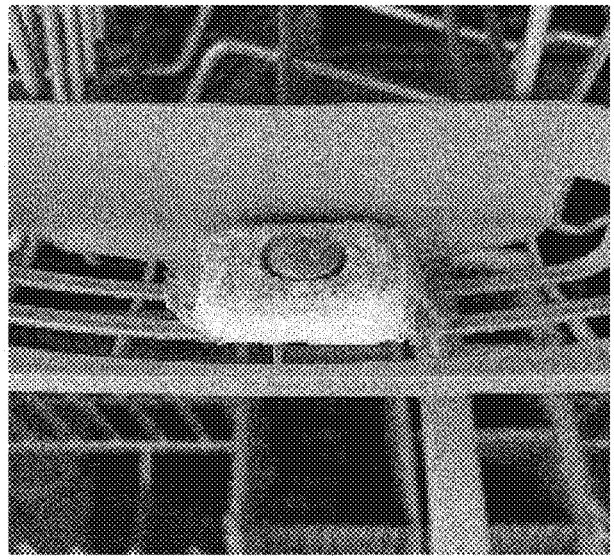
FIG. 2a shows the intact wrapped tablet of film E7 before the dishwasher was started.
Figure 2B:
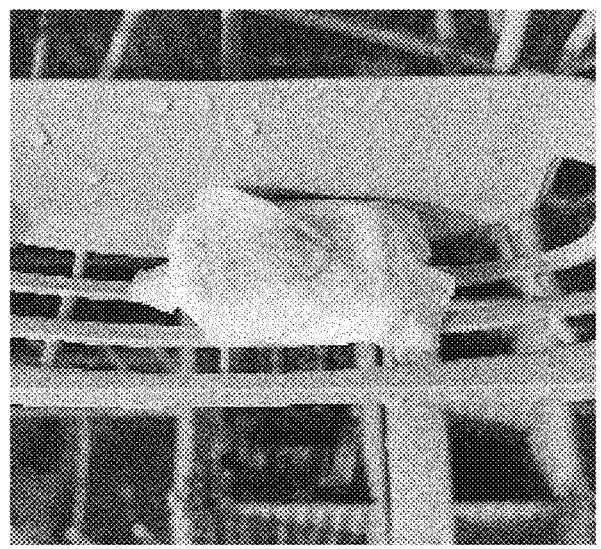
FIG. 2b corresponds to 5 mins into the cycle, FIG. 2c 10 mins into the cycle, FIG. 2d 15 mins into the cycle and FIG. 2d at the end of the cycle.
Figure 2C:
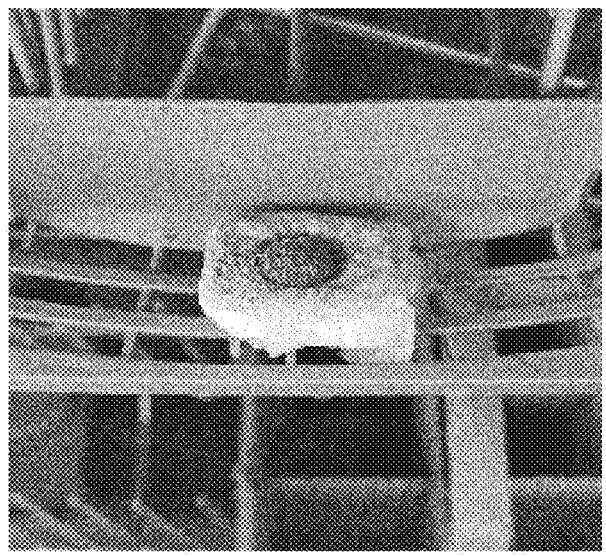
Figure 2D:
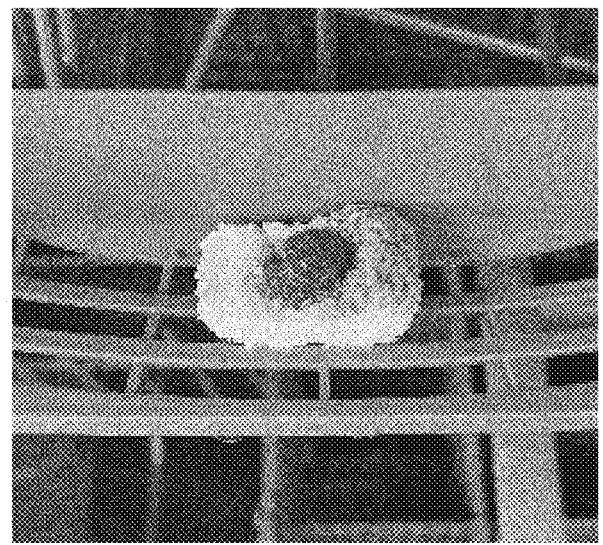
Figure 2E:
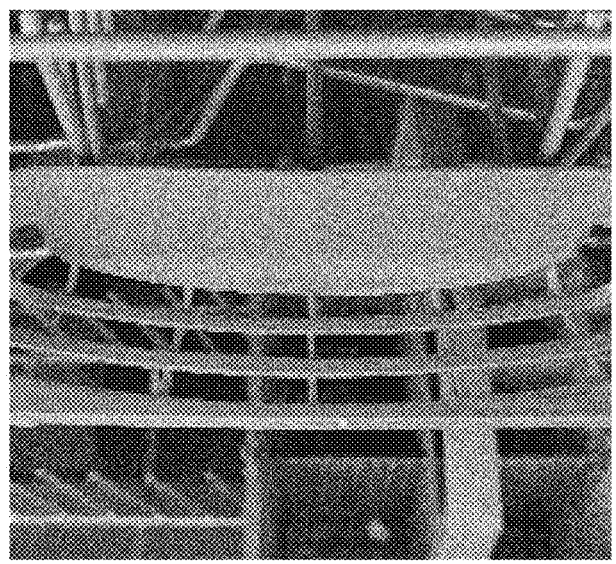

The dispersion of the film and dissolution of the product was tested in real life conditions using a Bosch 'Series 2' dishwasher and compared against the commercially available PVOH wrapped tablets. The cycle selected was the Eco 45 that washes at 45° C. for 45 min and the dishwasher cycle was paused every 5 minutes to evaluate the condition of the sachet and assess the dissolution of the tab. Table 6 shows how the inventive film dispersed over the first 10 mins of the cycle, it was fully dispersed after 15 minutes and there was no trace of the film at the end of the cycle. This compared favourably to the control PVOH film which initially dissolves a bit faster. FIG. 2 shows the dissolution of the tablet wrapped in the inventive film during the dishwasher cycle. FIG. 2a shows the intact wrapper and tablet before the dishwasher was started. FIG. 2b corresponds to 5 mins into the cycle, FIG. 2c 10 mins into the cycle, FIG. 2d 15 mins into the cycle and FIG. 2d at the end of the cycle where no tablet or film remains.

TABLE 6

| Sample | 5 min | 10 min | 15 min | End of cycle |
|---|---|---|---|---|
| Film E7 + enclosed dishwasher tablet | Film partially dispersed | Film partially dispersed | Film fully dispersed | No traces of film |
| PVOH enclosed dishwasher tablet | Film fully dissolved | Film fully dissolved | Film fully dissolved | No traces of film |

This test demonstrates that films of the present invention were made into sachets that could be safely handled by the consumer and released the detergent on contact with water in the dishwasher.

Example 6: Merging Resistance of Protein Multilayers in High Humidity Conditions Sachets were produced using the multilayer film of E7, by heat sealing along the length and ends of the film with an RS PRO heat sealer on power 2. The sealed sachets contained a commercial dishwasher Finish® tablet from Reckitt Benckiser previously wrapped with PVOH. The sachets could be easily handled and maintained their integrity.

Figure 3:
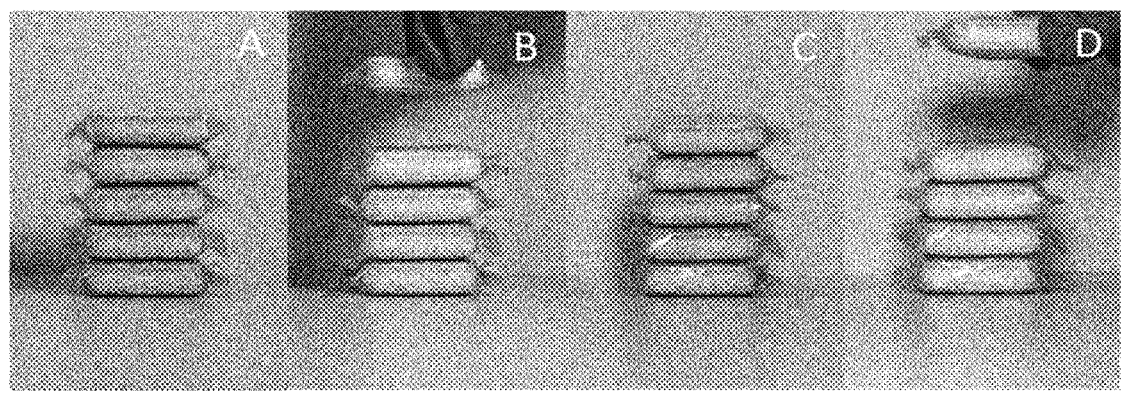
FIG. 3 shows dishwasher tablets wrapped in film E7 wherein A was a stack of tablets at t=0, B shows the merging test at t=0, C was a stack of tablets after 48 hours in 70% RH, and D shows the merging test after 48 hours in 70% RH.
Figure 4:
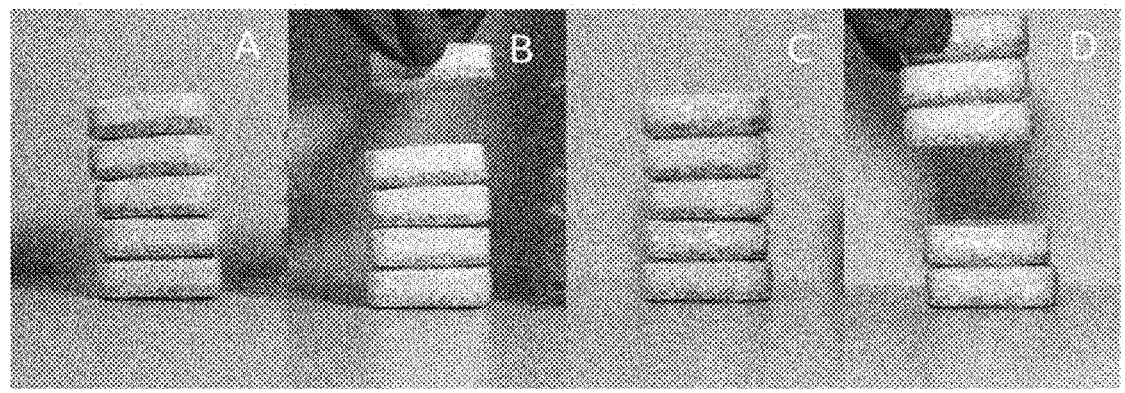
FIG. 4 shows PVOH wrapped dishwasher tablets, wherein A was a stack of tablets at t=0, B shows the merging test at t=0, C was a stack of tablets after 48 hours in 70% RH, and D shows the merging test after 48 hours in 70% RH.

One of the most common customer types of feedback on existing dishwasher tablet products wrapped with PVOH is that wrapped tablets stick together and merging with each other, making it hard to separate them and often renders them unusable. This is due to PVOHs high dissolution rate in water meaning that high humidity in the environment can lead to the film being sticky. To test the resistance to merging of the sachets made from inventive multilayer enclosing the dishwasher tablet samples were stored in a high humidity conditions, 70% relative humidity and 20° C., which is commonly found in households in areas like the bathroom or kitchen, where dishwasher detergent products are usually stored. The tablets wrapped in the inventive film were stored in stacks of 5 next to a similar stack of commercially available tablets wrapped in PVOH. After 48 hours of exposure to high humidity, the samples were evaluated for their ease of separation from each other. This was done by picking up the tablet at the top of the pile and observing if the single tablet could be picked up. As seen in FIG. 3, the samples wrapped in inventive films did not show any issues or resistance to picking up the top tablet individually from its stack, whereas in FIG. 4 the PVOH wrapped samples were merged, stuck to each other and the top three tablets were inadvertently picked up together.

The invention claimed is:

1. A film comprising greater than or equal to 50 wt % of a combination of a plant protein and a polysaccharide based upon the total weight of the film at 55% relative humidity and 22° C., wherein the weight ratio of polysaccharide to plant protein is in the range 0.1:1 to 2:1, and wherein the plant protein has been pretreated with an organic acid.

2. A film as claimed in claim 1, comprising:
a first layer comprising polysaccharide; and
a second layer comprising a plant protein, wherein the plant protein has been pre-treated with an organic acid;
wherein the second layer is in contact with a first surface of the first layer.

3. A film according to claim 2, wherein the first layer further comprises a plant protein, wherein the plant protein has been pre-treated with an organic acid.

4. A film according to claim 2, wherein the second layer further comprises polysaccharide.

5. A film as claimed in claim 1, wherein the weight ratio of polysaccharide to plant protein is in the range 0.15:1 to 1.5:1.

6. A film as claimed in claim 1, wherein the film has a thickness of between 20 μm and 120 μm.

7. A film as claimed in claim 1, wherein the plant protein is selected from soybean protein, pea protein, rice protein, potato protein, rapeseed protein, and/or sunflower protein.

8. A film as claimed in claim 1, comprising 2.0 to 40 wt % plant protein based upon the total weight of the film at 55% relative humidity and 22° C.

9. A film as claimed in claim 1, wherein the polysaccharide is selected from pullulan, wheat starch, potato starch, pea starch, waxy potato starch, maize starch, waxy maize starch, high amylose maize starch, tapioca starch, cassava starch, rye starch, sorghum starch, chickpea starch, soy starch, a modified starch, or a mixture thereof.

10. A film as claimed in claim 1, comprising 30 to 70 wt % polysaccharide based upon the total weight of the film at 55% relative humidity and 22° C.

11. A film as claimed in claim 1, comprising 8 to 20 wt % water based upon the total weight of the film at 55% relative humidity and 22° C.

12. A film as claimed in claim 1, further comprising a plasticiser selected from glycerol, polyethylene glycol, propylene glycol, sorbitol, mannitol, xylitol, triethyl citrate, fatty acids, glucose, mannose, fructose, sucrose, urea, lecithin, waxes, amino acids and organic acids, or a mixture thereof.

13. A film as claimed in claim 12, comprising 5 to 30 wt % plasticiser based upon the total weight of the film at 55% relative humidity and 22° C.

14. A film as claimed in claim 1, further comprising a pigment or dye selected from carotenoids, chlorophyllins, anthocyanins and betanin.

15. A film as claimed in claim 1, further comprising a structural reinforcement agent selected from microcrystalline cellulose, micro-fibrillated celluloses, cellulose fibres extracted from the pulp of citrus fruits, microfibrous cellulose from fermentation, starch microcrystals, clays, or a mixture thereof.

16. A film as claimed in claim 15, comprising 0.5 to 5 wt % of said structural reinforcement agent based upon the total weight of the film at 55% relative humidity and 22° C.

17. A film as claimed in claim 1, further comprising a hydrophobic agent selected from a plant-based oil or a plant-based fatty acid.

18. A film as claimed in claim 17, comprising up to 5.0 wt % of a hydrophobic agent based upon the total weight of the film at 55% relative humidity and 22° C.

19. A film as claimed in claim 1, wherein the organic acid used in the pre-treatment is selected from acetic acid, an α-hydroxy acid, and a β-hydroxy acid.

20. A film as claimed in claim 2, wherein the plant protein in the second layer has a protein secondary structure with at least 40% intermolecular β-sheet.

* * * * *